United States Patent
Baskaran et al.

(10) Patent No.: US 11,500,557 B2
(45) Date of Patent: *Nov. 15, 2022

(54) SYSTEMS AND METHODS FOR ENERGY PROPORTIONAL SCHEDULING

(71) Applicant: QUALCOMM TECHNOLOGIES, INC., San Diego, CA (US)

(72) Inventors: Muthu M. Baskaran, Old Tappan, NJ (US); Thomas Henretty, Brooklyn, NY (US); Ann Johnson, Saratoga, CA (US); Athanasios Konstantinidis, Brooklyn, NY (US); M. H. Langston, Beacon, NY (US); Janice O. McMahon, Bethesda, MD (US); Benoit J. Meister, New York, NY (US); Paul D. Mountcastle, Moorestown, NJ (US); Aale Naqvi, New York, NY (US); Benoit Pradelle, Cologne (DE); Tahina Ramananandro, New York, NY (US); Sanket Tavarageri, New York, NY (US); Richard A. Lethin, New York, NY (US)

(73) Assignee: Reservoir Labs Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,890

(22) Filed: Jan. 17, 2020

(65) Prior Publication Data

US 2020/0393980 A1 Dec. 17, 2020

Related U.S. Application Data

(63) Continuation of application No. 14/987,202, filed on Jan. 4, 2016, now Pat. No. 10,540,107.

(Continued)

(51) Int. Cl.
G06F 9/44 (2018.01)
G06F 3/06 (2006.01)
G06F 8/41 (2018.01)

(52) U.S. Cl.
CPC .......... G06F 3/0631 (2013.01); G06F 3/0604 (2013.01); G06F 3/0638 (2013.01);
(Continued)

(58) Field of Classification Search
CPC .... G06F 3/0604; G06F 3/0631; G06F 3/0638; G06F 3/0671; G06F 8/4432; G06F 8/4441; G06F 8/453; Y02D 10/00
(Continued)

(56) References Cited

U.S. PATENT DOCUMENTS 5,473,533 A 12/1995 Mengelt
6,374,403 B1 4/2002 Darte et al.
(Continued)

FOREIGN PATENT DOCUMENTS

WO 2010033622 3/2010

OTHER PUBLICATIONS

Hsu et al., "Compiler-Directed Dynamic Voltage/Frequency Scheduling for Energy Reduction in Microprocessors", 2001, ACM, pp. 275-278 (Year: 2001).*
(Continued)

Primary Examiner — Ted T. Vo
(74) Attorney, Agent, or Firm — Seyfarth Shaw LLP

(57) ABSTRACT

A compilation system using an energy model based on a set of generic and practical hardware and software parameters is presented. The model can represent the major trends in energy consumption spanning potential hardware configurations using only parameters available at compilation time. Experimental verification indicates that the model is nimble yet sufficiently precise, allowing efficient selection of one or
(Continued)

```
1  for (i = 0; i < N; i++) {
2  
3      // BEGINNING OF POWER-COHERENT REGION
4      A[i] = 0.0;
5      for (j = 0; j < N; j++) {
6          B[i][j] = A[i];
7      // END OF POWER-COHERENT REGION
8  
9          A[i] += 1.0 * j;
10     }
11 }
```

Listing 1. Invalid power-coherent region.

more parameters of a target computing system so as to minimize power/energy consumption of a program while achieving other performance related goals. A voltage and/or frequency optimization and selection is presented which can determine an efficient dynamic hardware configuration schedule at compilation time. In various embodiments, the configuration schedule is chosen based on its predicted effect on energy consumption. A concurrency throttling technique based on the energy model can exploit the power-gating features exposed by the target computing system to increase the energy efficiency of programs.

19 Claims, 11 Drawing Sheets

Related U.S. Application Data

(60) Provisional application No. 62/099,345, filed on Jan. 2, 2015.

(52) U.S. Cl.
CPC .......... *G06F 3/0671* (2013.01); *G06F 8/4432* (2013.01); *G06F 8/4441* (2013.01); *G06F 8/453* (2013.01); *Y02D 10/00* (2018.01)

(58) Field of Classification Search
USPC .................................................. 717/151–161
See application file for complete search history.

(56) References Cited

U.S. PATENT DOCUMENTS

| | | | |
|---|---|---|---|
| 6,567,976 B1 | 5/2003 | Wolf | |
| 7,100,000 B1 | 8/2006 | Ittycheriah et al. | |
| 7,398,484 B2 | 7/2008 | Ruf | |
| 7,523,327 B2 | 4/2009 | Cline et al. | |
| 8,117,478 B2 | 2/2012 | Liu et al. | |
| 9,058,164 B2 | 6/2015 | Kanakogi | |
| 9,201,484 B2 | 12/2015 | Ginggen et al. | |
| 10,095,434 B2 | 10/2018 | Baskaran et al. | |
| 10,496,304 B2 | 12/2019 | Baskaran et al. | |
| 10,540,107 B2 * | 1/2020 | Baskaran | G06F 8/4432 |
| 11,068,178 B2 | 7/2021 | Baskaran et al. | |
| 2004/0139222 A1 | 7/2004 | Slik et al. | |
| 2008/0250401 A1 | 10/2008 | Puri et al. | |
| 2016/0077569 A1 | 3/2016 | Aizik et al. | |
| 2016/0320825 A1 | 11/2016 | Panda et al. | |
| 2018/0074750 A1 | 3/2018 | Dudas et al. | |
| 2022/0057949 A1 | 2/2022 | Baskaran et al. | |

OTHER PUBLICATIONS

Chung-Hsing Hsu, "Compiler-Directed Dynamic Voltage and Frequency Scaling for CPU Power and Energy Reduction", Oct. 2003, Thesis, Rutgers University, New Jersey, 120 pages. (Year: 2003).*
Ahmed N., et al., "Tiling Imperfectly-Nested Loop Nests", IEEE 2000, 14 pgs.
Amarasinghe S.P., et al., "Communication Optimization and Code Generation for Distributed Memory Machines", Proceedings of The AAM SIGPLAN '93 Conference on Programming Language Design and Implementation (PLDI), Jun. 1993, 14 pages.
Baskaran M.M., et al., "Compiler-Assisted Dynamic Scheduling for Effective Parallelization of Loop Nests on Multicore Processors", ACM, Feb. 14, 2009, pp. 219-228, ISBN 978-1-60558-397-6.
Beatson R., et al., "A Short Course on Fast Multipole Methods", Numerical Mathematics and Scientific Computation, 1997, 37 pages.
Boldo S., et al., "Combining Coq and Gappa for Certifying Floating-Point Programs", International Conference on Intelligent Computer Mathematics, 2009, 16 pages.

Bondhugula U., "Compiling Affine Loop Nests for Distributed-Memory Parallel Architectures", SC '13: Proceedings of the International Conference on High Performance Computing, Networking, Storage and Analysis, Nov. 2013, 12 pages.
Borkar S., "Exascale Computing—A Fact or a Fiction?", 2013 IEEE 27th International Symposium on Parallel and Distributed Processing, IPDPS, May 21, 2013, 49 pages.
Brisebarre N., et al., "Rigorous Polynomial Approximation Using Taylor Models in Coq", TaMaDi project of the French ANR (ref. ANR-2010-BLAN-0203-01, Version 1), Dec. 19, 2011, 15 pages.
Chu E., et al., "A Primal-Dual Operator Splitting Method for Conic Optimization", Electrical Engineering Department, Stanford University, Dec. 6, 2013, 24 pages.
Cohen C., et al., "CoqEAL—The Coq Elective Algebra Library", University of Gothenburg and Inria Sophia-Antipolis, Feb. 3, 2013, 29 pages.
Cohen C., et al., "Formal Proofs in Real Algebraic Geometry: From Ordered Fields to Quantifier Elimination", Logical Methods in Computer Science, HAL, Feb. 16, 2012, 41 pages.
Curtis-Maury M., et al., "Prediction-Based Power-Performance Adaptation of Multithreaded Scientific Codes", IEEE Transactions on Parallel and Distributed Systems, vol. 19, No. 10, Oct. 2008, pp. 1396-1410.
Darulova E., et al., "Sound Compilation of Reals", POPL '14, Jan. 22-24, 2014, 14 pages.
Dathathri R., et al., "Generating Efficient Data Movement Code for Heterogeneous Architectures with Distributed-Memory", Indian Institute of Science, Sep. 11, 2013, 64 pages.
Demmel J., et al., "Communication-Optimal Parallel and Sequential QR and LU Factorizations", Electrical Engineering and Computer Sciences, Aug. 4, 2008, 136 pages.
DiPietro R.C., "Extended Factored Space-Time Processing for Airborne Radar Systems", [1992] Conference Record of the Twenty-Sixth Asilomar Conference on Signals, Systems & Computers, IEEE, 1992, 6 pages.
Domahidi A., et al., "ECOS: An SOCP Solver For Embedded Systems", European Control Conference, Zurich, Switzerland, Jul. 17-19, 2013, pp. 3071-3076.
Feautrier P., "Some Efficient Solutions to the Affine Scheduling Problem Part I One-Dimensional Time", Jun. 27, 1996, 42 pages.
Giampapa M., et al., "Experiences with a Lightweight Supercomputer Kernel: Lessons Learned from Blue Gene's CNK", Sc '10: Proceedings of the 2010 ACM/IEEE International Conference for High Performance Computing, Networking, Storage and Analysis, IEEE, 2010, 10 pages.
Greengard L., "Fast Algorithms for Classical Physics", Science, vol. 265, Aug. 12, 1994, pp. 909-914.
Irigoin F., et al., "Supernode Partitioning", In Proceedings of the 15th ACM SIGPLAN-SIGACT Symposium on Principles of programming languages, pp. 319-329, New York, NY, USA, Jan. 1988. ACM Press, ISBN 0-89791-252-7, pp. 1-11.
Kelner J.A., et al., "A Simple, Combinatorial Algorithm for Solving SDD Systems in Nearly-Linerar Time", MIT, Jan. 28, 2013, 32 pages.
Kogge P., et al., "ExaScale Computing Study: Technology Challenges in Achieving Exascale Systems", DARPA IPTO, Sep. 28, 2008, 297 pages.
Langston M.H., et al., "A Free-Space Adaptive FMM-Based PDE Solver in Three Dimensions", Communications in Applied Mathematics and Computational Science, Jul. 2011, 28 pages.
Langston M.H., et al., "Re-Introduction of Communication-Avoiding FMM-Accelerated FFTs with GPU Acceleration," Reservior Labs, Inc., IEEE, 2013, 6 pages.
Lashuk I., et al., "A Massively Parallel Adaptive Fast Multipole Method on Heterogeneous Architectures", Communications of the ACM, vol. 55, No. 5, May 2012, 9 pages.
Lebret H., et al., "Antenna Array Pattern Synthesis via Convex Optimization", IEEE Transactions on Signal Processing, vol. 45, No. 3, Mar., 1997, pp. 526-532.
Leroy X., "Formal Verification of a Realistic Compiler", Communications of the ACM, vol. 52, No. 7, Jul. 2009, 9 pages.

(56) References Cited

OTHER PUBLICATIONS

Li D., et al., "Hybrid MPI/OpenMP Power-Aware Computing", 2010 IEEE International Symposium on Parallel & Distributed Processing (IPDPS), Apr. 2010, pp. 1-12.

Meister B., et al., "SANE: An Array Language for Sensor Applications", WOLFHPC 2012, Conference Paper, Nov. 2012, 7 pages.

Meister B., et al., "Polynomial Approximations in the Polytope Model: Bringing the Power of Quasi-Polynomials to the Masses", 2008, 10 pages.

Moltmann P.P., "Energy Estimation for CPU-Events Dependent on Frequency Scaling and Clock Gating", Department of Computer Science, University of Karlsruhe (TH), Sep. 1, 2006, 25 pages, retrieved from site https://os.itec.kit.edu/21_586.php.

Nieplocha J., et al., "Advances, Applications, and Performance of the Global Arrays Shared Memory Programming Toolkit", The International Journal of High Performance Computing Applications, vol. 20, No. 2, Summer 2006, pp. 203-231.

Park J., et al., "Efficient Backprojection-Based Synthetic Aperture Radar Computation with Many-Core Processors," In Proceedings of Supercomputing '12, Nov. 10-16, 2012, 12 pages.

Punyamurtula S., et al., "Minimum Dependence Distance Tiling of Nested Loops with Non-Uniform Dependences", IEEE, 1994, pp. 74-81.

Sha S., et al., "Power and Energy Analysis on Intel Single-Chip Cloud Computer System", 2012 Proceedings of IEEE Southeastcon, Mar. 2012, 6 pages.

Shalf J., et al., "Exascale Computing Technology Challenges", Springer-Verlag Berlin Heidelberg, 2011, 25 pages.

Sleator D., et al., "A Data Structure for Dynamic Trees", Journal of Computer and System Sciences, vol. 26, No. 3, Jun. 1983, 30 pages.

Spielman D.A., et al., "A Local Clustering Algorithm for Massive Graphs and its Application to Nearly-Linear Time Graph Partitioning", SIAM Journal on Computing, Sep. 18, 2008, 25 pages.

Spielman D.A., et al., "Nearly Linear Time Algorithms for Preconditioning and Solving Symmetric, Diagonally Dominant Linear Systems", Siam J. Matrix Anal. Appl., vol. 35, No. 3, 2014. pp. 835-885.

Spielman D.A., et al., "Spectral Sparsification of Graphs", Jul. 22, 2010, 49 pages.

Sturm J.F., "Using SeDuMi 1.02, a MATLAB Toolbox for Optimization Over Symmetric Cones", Communications Research Laboratory, McMaster University, Hamilton, Canada, Aug. 1, 1998, 24 pages.

Tak P., et al., "A Framework for Low-Communication 1-D FFT", Intel Corporation, IEEE, SC12, Nov. 10-16, 2012, 12 pages.

Tarski A., "Project Rand: A Decision Method for Elementary Algebra and Geometry," Rand Corporation, Aug. 1, 1948, 67 pages.

"Tarski's Theorem", Wolfram MathWorld, website, date accessed: Apr. 26, 2018. available at: http://mathworld.wolfram.com/tarskistheorem.html, 1 page.

Toh K.C., et al., "On the Implementation and Usage of SDPT3—A Matlab Software Package for Semi-Definite-Quadratic-Linear Programming, Version 4.0", Operations Research and Information Engineering, Jul. 17, 2006, 46 pages.

"Suitesparse: A Suite of Sparse Matrix Software", website, date accessed: Apr. 26, 2018. available at: http://faculty.cse.tamu.edu/davis/suitesparse.html, 2 pages.

Vasilache N., et al., "Trading off Memory for Parallelism Quality," Second International Workshop on Polyhedral Compilation Techniques (IMPACT '12), Paris, France, Jan. 23, 2012, 9 pages.

Ward J., "Space-Time Adaptive Processing for Airborne Radar", MIT, Lincoln Laboratory, Dec. 13, 1994, 179 pages.

Xue J., "On Tiling as a Loop Transformation", Department of Mathematics, Statistics and Computing Science, University of New England, Australia, 1997, 15 pages.

Andersen E.D., et al.,"The MOSEK Interior Point Optimizer for Linear Programming: An Implementation of the Homogeneous Algorithm", High Performance Optimization, Applied Optimization, Kluwer Academic Publishers, Dordrecht, The Netherlands, vol. 33., Springer, Boston, MA, 2000, pp. 197-232, http://www.mosek.com/.

Carbonell J.G., et al., "Lecture Notes in Artificial Intelligence: Subseries of Lecture Notes in Computer Science, Logic for Programming Artificial Intelligence, and Reasoning", 14th International Conference, LPAR 2007, Yerevan, Armenia, Oct. 15-19, 2007, 572 pages.

Collins G.E., "Quantifier Elimination for Real Closed Fields by Cylindrical Algebraic Decomposition", Automata Theory and Formal Languages, University of Wisconsin, 2005, 50 pages.

Demmel J., et al., "Lower Bounds on Algorithm Energy Consumption: Current Work and Future Directions," in SIAM Conference on Computational Science and Engineering, University of California, Berkeley, University of California, Berkeley, Mar. 1, 2013, 24 pages.

Demmell J.W., et al., "Communication Avoiding Rank Revealing QR Factorization with col. Pivoting", SIAM Journal on Matrix Analysis and Applications, 2015, vol. 36, No. 1, pp. 55-89.

Gupta A., et al., "WSMP: Watson Sparse Matrix Package Part I—Direct Solution of Symmetric Systems Version 18.01", IBM Research Report, Nov. 16, 2000, 52 pages.

Gupta A., et al., "WSMP: Watson Sparse Matrix Package Part II—Direct Solution of General Systems Version 18.01", IBM Research Report, Nov. 20, 2000, 39 pages.

Gupta A., et al., "WSMP: Watson Sparse Matrix Package Part III—Iterative Solution of Sparse Systems Version 18.01", IBM Research Report, Novembers, 2007, 31 pages.

Gurobi Optimization, Inc.: "Gurobi Optimizer Reference Manual", Version 7.0,2017, pp. 1-693.

Konstantinidis A., et al., "Parametric GPU Code Generation for Affine Loop Programs", Springer International Publishing, Switzerland, 2014, 16 pages.

Kulp J., et al., "Open Component Portability Infrastructure (OPENCPI)", Mercury Federal Systems, Inc., AFRL-RI-RS-TR-20 13-055, Final Technical Report, Mar. 2013, 62 pages.

Meister B., et al., "The R-Stream Compiler", Jan. 2011, Encyclopedia of Parallel Computing, pp. 1756-1765.

Mountcastle P., "Compressive Sensing in Joint Angle-Frequency Domain", SBIR Data Rights—Reservoir Labs, Inc.—DARPA Perfect Program, Jan. 27, 2014, 11 pages.

Mountcastle P.D., et al., "Generalized Adaptive Radar Signal Processing", Proceedings of the 25th Army Science Conference, Technology Service Corporation, Dec. 1, 2008, 8 pages.

O'Donoghue B., et al., "Operator Splitting for Conic Optimization via Homogeneous Self-Dual Embedding", Oct. 22, 2018, arXiv:1312.3039v1 [math OC], Dec. 11, 2013, 30 pages.

Solomonik E., et al., "Communication-Optimal Parallel 2.5D Matrix Multiplication and LU Factorization Algorithms", University of California, 2011, 20 pages.

Sozeua M., "Coq Reference Manual", Mar. 2018, 35 pages.

Spielman D.A., et al., "Nearly-Linear Time Algorithms for Graph Partitioning, Graph Sparsification, and Solving Linear Systems", Jun. 13-15, 2004, 10 pages.

Northwest National Laboratory, "Test, Assessment and Verification Effort (TAV) for the DARPA Perfect Program", High Performance Computing, Pacific, Northwest National Laboratory, Jul. 2015, 2 pages, URL: https://web.archive.org/web/20151129182219/http://hpc.pnnl.gov/PERFECT/.

Toh K.C., et al., "SDPT3 Version 4.0—A Matlab Software for Semidefinite-Quadratic-Linear Programming", website, Jate accessed: Apr. 26, 2018 available at: http://www.math.nus.edu.sg/.about.mattohkc/sdpt3.html, 2 pages.

Winter S., et al., "On Real and Complex Valued I1-Norm Minimization for Overcomplete Blind Source Separation", IEEE Workshop on Applications of Signal Processing to Audio and Acoustics, NTT Communication Science Laboratories, Oct. 16-19, 2005, pp. 86-89.

* cited by examiner

```
1  for (i = 0; i < N; i++) {
2
3      // BEGINNING OF POWER-COHERENT REGION
4      A[i] = 0.0;
5      for (j = 0; j < N; j++) {
6          B[i][j] = A[i];
7          // END OF POWER-COHERENT REGION
8
9          A[i] += 1.0 * j;
10     }
11 }
```

Listing 1. Invalid power-coherent region.

FIG. 1

```
1   // initialization
2   for each instruction i {
3     create a region Ri encompassing i
4   }
5
6   for each power-coherent region Ri {
7
8     // try to expand up the existing regions
9     parentLoop = innermost loop enclosing Ri
10    while parentLoop exists {
11      abort = false
12      sisterRegions = all regions in parentLoop
13      for each region Rj in sisterRegions {
14        if isFusionBeneficial(Ri, Rj) {
15          toFuse = toFuse + Rj
16        } else {
17          abort = true
18          break
19        }
20      }
21
22      if abort {
23        break
24      }
25
26      fuse(Ri, toFuse)
27      parentLoop = parent(parentLoop)
28    }
29
30    // try to expand to successor loops and regions
31    for each neighbor region or loop Xj following Ri {
32      if isFusionBeneficial(Ri, regions(Xj)) {
33        fuse(Ri, regions(Xj))
34      } else {
35        break
36      }
37    }
38  }
```

Listing 2. Power-Coherent Region construction algorithm in pseudo code

FIG. 2

```
1   for (i=0; i<N; i++) {              | #pragma omp parallel for
2     for (j=0; j<N; j++) {             | for (i=0; i<N; i++) {
3       C[i][j] = 0;                    |   rp_set(0);
4       for (k=0; k<N; k++) {           |   for (j=0; j<N; j++) {
5         C[i][j] +=                    |     C[i][j] = 0;
6           A[i][k] * B[k][j];          |   }
7       }                               |   rp_reset();
8     }                                 |
9   }                                   |   rp_set(15);
10                                      |   for (k=0; k<N; k++) {
11                                      |     for (j=0; j<N; j++) {
12                                      |       C[i][j] +=
13                                      |         A[i][k] * B[k][j];
14                                      |     }
15                                      |   }
16                                      |   rp_reset();
17                                      | }
```

Listing 3. Example of Power API call inserted at the boundary of two power-coherent regions after the code optimization.

SYSTEMS AND METHODS FOR ENERGY PROPORTIONAL SCHEDULING

CROSS-REFERENCE TO RELATED APPLICATIONS

This application is a continuation of U.S. patent application Ser. No. 14/987,202, entitled "Systems and Methods for Energy Proportional Scheduling," filed on Jan. 4, 2016, now U.S. Pat. No. 10,540,107, which claims the benefit of priority to U.S. Provisional Patent Application No. 62/099,345, entitled "Systems and Methods for Software Optimization," filed on Jan. 2, 2015, the contents of which are incorporated herein by reference in their entireties.

STATEMENT OF GOVERNMENT SUPPORT

This invention was made with government support under Contract No. HR0011-12-C-0123 awarded by the Defense Advanced Research Projects Agency (DARPA). The government has certain rights in the invention.

FIELD OF THE INVENTION

This disclosure generally relates to systems and methods for compiler optimization and, in particular, for optimizations that can reduce energy consumption during program execution.

BACKGROUND

Energy-proportional scheduling generally aims at improving the proportionality of energy consumption according to a resource usage that can improve the overall performance. It has been applied to the CPU through server consolidation, networks through link speed scaling, and hard disk drives through disk speed scaling. To minimize energy consumption, voltage and frequency are often managed at runtime using control loops. Several runtime controllers typically have a similar behavior: the program is observed for a short duration and, based on this observation, a new voltage and frequency setting is chosen for the upcoming phases. Frequently, the program instrumentation is based on hardware counters. Such runtime mechanisms allow flexibility and have been reported to provide significant energy savings in various contexts. For example, the default dynamic voltage frequency selection or scaling (DVFS) control performed in Linux™ operating system exploits a similar runtime strategy. However, runtime DVFS controllers are generally unstable and non-deterministic by nature.

As an alternate solution, voltage and frequency can be controlled at compilation time. In that case, the energy consumption of the various configurations may be predicted. According to one representative approach, the optimal DVFS setting is determined by solving a mixed integer linear programming (MILP) formulation of the selection problem at compilation time. Another similar approach is based on linear programming. The energy models used in these techniques are based on parameters modeling the performance of the programs being compiled. These approaches generally assume that a preliminary profiling of the program being compiled has been performed over a set of relevant input data sets. Such profiling can be impractical if not infeasible in typical production environments however, because often it greatly increases the compilation time and generally requires representative datasets and the target hardware to be available at compilation time.

Concurrency throttling is also a common optimization applied to improve the energy efficiency of programs. However, similarly to DVFS, a runtime approach is often chosen, sometimes combined with DVFS. Runtime mechanisms generally imply instabilities and nondeterminism, which are often undesirable. Some compile-time approaches to concurrency throttling have been suggested. Similarly to DVFS, however, compilation-time approaches to concurrency throttling also generally exploit profiling runs to determine the optimal concurrency and, as such, may be difficult to implement in practice.

A co-pending U.S. patent application Ser. No. 14/699,876, entitled, "Systems and Methods for Power Optimization of Processors," describes systems and methods to control processor Voltage and Frequency Scaling (VFS), depending on the memory activity in code sections, called instruction windows. In general, the instruction windows are qualified as memory intense or compute intense depending on the operations they performed. Then, a low voltage and frequency may be set before memory-intense windows while a high voltage and frequency can be set before entering compute-intense windows. Such strategy can achieve energy saving because the processor does not need to run at full speed when it waits for data from memory.

In order to increase the benefits of VFS and to thereby increase energy savings, instruction windows must obey to some rules. In particular, the instruction window must be large enough to amortize the cost of switching the voltage and frequency. Moreover, it is highly desirable that the instructions within a window have a similar memory intensity, in order to benefit from the chosen frequency.

SUMMARY

In various embodiments, a compiler provides techniques to support low power embedded computing of various computation and/or memory intensive procedures such as Intelligence Surveillance Reconnaissance (ISR), signal processing, solution of optimization problems, etc. In order to enhance the effect of the voltage, frequency, and/or another processor parameter that can affect its power/energy consumption that may be chosen for a certain period during the execution of a program, a generic energy model that includes high-level hardware and software parameters is employed. In particular, the energy model does not require programs to be profiled and is not based on runtime hardware counters. Such generic energy models may be less accurate than profile-based energy models. However, our model can provide determinism, stability, and portability across various target platforms. Moreover, our model can exploit a polyhedral program model to determine at compilation time metrics such as operation count or data span. We implement DVFS and concurrency throttling consistently, using the same energy model for predicting the major trends in energy consumption.

One advantage of our energy model is that it can serve as a unique predictor for execution time and energy consumption. Therefore, rather than selecting an operating voltage and/or frequency based on a type of an instruction window, the voltage and/or frequency for a program region may be selected based on a predicted value of energy consumed in executing the portion of the program within that region. This can allow the selection of operating voltages and/or frequencies for various program regions such that the overall energy consumption relative to performance can be optimized or minimized. The energy model is parameterized by architectural parameters such as, for instance, power consumption of computation and/or memory access operations, and/or floating-point performance.

One limitation of the instruction-windows-based technique described in U.S. patent application Ser. No. 14/699,876, incorporated herein by reference in its entirety, is that generally only two choices are available for VFS. Typically, the instruction windows may be designated either memory-bound or compute-bound and, as such, the lowest frequency is set for memory-bound regions and the highest may be used for compute-bound instruction windows. However, in some cases, the highest or the lowest frequency is not necessarily the best choice, especially if the instruction windows include a more diverse mix of memory and compute operations.

The energy model described herein can provide execution time and energy predictions for any available frequency setting over a selected program region. Therefore, any two, more than two, and even all of the available frequencies can be tested and the one expected to achieve minimal energy consumption may be used. The likelihood of achieving energy optimization of the overall program can thus be improved using the energy model, especially when an intermediate frequency and not the lowest or the highest one may lead to minimal energy consumption. DVFS, exploring several voltage, frequency, and/or power/energy affecting parameter values can be performed efficiently, at compile time, using different embodiments of the energy model.

Another optimization called concurrency throttling is also provided. When a processor has the ability to shut down its idle cores to save power, using less processor cores may save energy with some programs. Energy saving in this manner can be achieved when a shared resource, such as memory for instance, is saturated. In that case, fewer processor cores can be used to run the program without incurring any slowdown, because one or more processors may wait for the shared resource to become available and not perform computations while waiting, at least at the rate when the shared resource is available. Energy/power can be saved as some cores idle.

In some compiler embodiments, concurrency throttling is implemented using the energy model used for DVFS. The memory usage of a program may be estimated using a polyhedral model, while the program execution time can be predicted using an embodiment of the energy model. Both memory usage and predicted execution time allow us to estimate the bandwidth requirements for the program. Using this information, the minimal number of cores to use is determined according to the bandwidth requirements and the actual bandwidth available on the platform. This methodology can be extended to other shared resources such as shared cache levels, network on chip, etc. In various embodiments, the energy model can represent at compile time major fluctuations in energy consumptions. In particular, the effects of DVFS, and concurrency throttling, as well, are represented by the energy model.

Accordingly, in one aspect, a method is provided for optimizing energy consumption of a data processor while executing a program. The method includes performing by a compilation processor the steps of: (a) generating within the program a first power-coherent region, and (b) computing using an energy model a number of estimated energy consumption values for the first power-coherent region, where each value corresponds to a respective power setting. The method also includes: (c) identifying an energy-minimizing power setting corresponding to a minimum of the several estimated energy consumption values, and (d) inserting in the first power-coherent region a power setting operation setting at least one parameter of the data processor according to the energy-minimizing power setting.

In some embodiments, each of the steps (a) through (d) is performed by the compilation processor via static analysis of the program and without executing any portion of the program, and without relying on a program execution profile. The steps (a) or (b) or both may be based on a polyhedral model of the program.

In some embodiments, generating the first power-coherent region includes performing by the compilation processor the step of partitioning program instructions into a number of groups, where each group at least initially has a specified number of instructions. The method may also include determining a type of a first group and merging another group into the first group if the type of the first group after the merging would not change and, otherwise designating the other group as a second group. The type of the first group may be either compute intense or memory intense. The method may include designating a group having a number of instructions at most equal to a specified threshold as a default power-coherent region.

In some embodiments, the energy model includes one or more of: an operating frequency of the data processor, an operating voltage of the data processor, a number of processing units in the data processor, a number of computations in the first power-coherent region, an amount of memory accessed by the first power-coherent region from a first memory level, power consumed by a unit of the data processor during one computation at a specified frequency, power consumed by a unit of the data processor for accessing one byte of data from a specified level of memory at the specified frequency, performance of a unit of the data processor at the specified frequency, and available bandwidth of the data processor at the specified level and using a specified number of processing units.

Computing an estimated energy consumption value corresponding to a frequency setting may include computing either or both of: (i) the energy consumed by a number of computational operations in the program using: a total number of computational operations in the first power-coherent region and average energy consumed by a single computational operation at the frequency setting, and (ii) energy consumed by a plurality of memory access operations in the first power-coherent region using: a total number of memory accesses within the first power-coherent region at one or more memory levels, available memory access bandwidth at the one or more memory levels at the frequency setting, average power consumption by a single memory access operation at the frequency setting, and a number of processing units in the data processor.

The available memory access bandwidth at the one or more memory levels at the frequency setting may be based on either: (A) a memory access bandwidth computed as function of: (i) a memory access bandwidth required by one processing unit at one of the one or more memory levels at the frequency setting, and (ii) the number of processing units in the data processor; or (B) a maximum memory access bandwidth available at one of the one or more memory levels at the frequency setting.

In some embodiments, the method includes computing a number of memory accesses required by a data structure within the first power-coherent region, and computing a stride between consecutive memory accesses by the data structure. The method may also include determining if the stride does not exceed a bulk-transfer size associated with a first memory level, and associating the number of memory accesses required by the data structure with the first memory level, if this condition is true and, otherwise, associating the number of memory accesses required by the data structure with a second memory level.

The power setting operation setting one or more parameters of the data processor may be inserted at a beginning of the first power-coherent region. The power setting operation may adjust a frequency of the data processor and/or an operating voltage of the data processor. The method may include inserting at an end of the first power-coherent region another power setting operation that: (i) adjusts a frequency of the data processor to a default frequency, and/or (ii) adjusts an operating voltage of the data processor to a default operating voltage.

In some embodiments, the method includes identifying a second power-coherent region within execution proximity of the first power-coherent region, and comparing: (i) the power setting operation inserted at the beginning in the first power-coherent region, (ii) the power setting operation inserted at the end in the first power-coherent region, and (iii) a power setting operation inserted in the second power-coherent region. The method may also include, based on the comparison, removing: (i) the power setting operation inserted at the end in the first power-coherent region, and/or (ii) the power setting operation inserted in the second power-coherent region.

In another aspect, a system is provided for optimizing energy consumption of a data processor while executing a program. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a) generate within the program a first power-coherent region, and (b) compute using an energy model a number of estimated energy consumption values for the first power-coherent region, where each value corresponds to a respective power setting.

In addition, the instructions program the processing unit to: (c) identify an energy-minimizing power setting corresponding to a minimum of the several estimated energy consumption values, and (d) insert in the first power-coherent region a power setting operation setting at least one parameter of the data processor according to the energy-minimizing power setting. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to optimize energy consumption of a data processor while executing a program. The instructions may program the processing unit to: (a) generate within the program a first power-coherent region, and (b) compute using an energy model a number of estimated energy consumption values for the first power-coherent region, where each value corresponds to a respective power setting.

The instructions may also program the processing unit to: (c) identify an energy-minimizing power setting corresponding to a minimum of the several estimated energy consumption values, and (d) insert in the first power-coherent region a power setting operation setting at least one parameter of the data processor according to the energy-minimizing power setting. In various embodiments, the instructions can program the processing unit to perform one or more of the method steps described above.

In another aspect, a method for optimizing energy consumption of a data processor having a number of processing units includes performing by a compilation processor the step of computing for a particular operation frequency and a particular value of a parameter of a resource, a required single-unit resource capacity for executing a specified program using one unit of the plurality of processing units. The method also includes computing, using the single-unit resource capacity, a maximum number of processing units $N_{max}$, such that using more than $N_{max}$ processing units would exceed an available resource capacity at the particular operation frequency and the particular value of the resource parameter. In addition, the method includes, for each value of a number of processing units N in a range from 1 up to $N_{max}$, estimating an energy consumption for executing the specified program using N processing units, and determining an optimized number of processing units $N_{opt}$ for which the estimated energy consumption is minimum. The resource may include data-processor memory bandwidth, and the resource parameter may include a memory level. In some embodiments, the resource includes one or more of data-processor input-output (I/O) bandwidth, network bandwidth, and disc-storage bandwidth.

In another aspect, a system is provided for optimizing energy consumption of a data processor having a number of processing units. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to compute for a particular operation frequency and a particular value of a parameter of a resource, a required single-unit resource capacity for executing a specified program using one unit of the plurality of processing units.

The instructions also program the processing unit to compute, using the single-unit resource capacity, a maximum number of processing units $N_{max}$, such that using more than $N_{max}$ processing units would exceed an available resource capacity at the particular operation frequency and the particular value of the resource parameter. In addition, the instructions program the processing unit to estimate, for each value of a number of processing units N in a range from 1 up to $N_{max}$, an energy consumption for executing the specified program using N processing units, and to determine an optimized number of processing units $N_{opt}$ for which the estimated energy consumption is minimum. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to optimize energy consumption of a data processor having a number of processing units. The instructions may program the processing unit to compute for a particular operation frequency and a particular value of a parameter of a resource, a required single-unit resource capacity for executing a specified program using one unit of the plurality of processing units.

The instructions may also program the processing unit to compute, using the single-unit resource capacity, a maximum number of processing units $N_{max}$, such that using more than $N_{max}$ processing units would exceed an available resource capacity at the particular operation frequency and the particular value of the resource parameter. In addition, the instructions may program the processing unit to estimate, for each value of a number of processing units N in a range from 1 up to $N_{max}$, an energy consumption for executing the specified program using N processing units, and to determine an optimized number of processing units $N_0$ for which the estimated energy consumption is minimum. In various embodiments, the instructions can program the processing unit to perform one or more of the method steps described above.

In another aspect, a method is provided for optimizing energy consumption of a data processor having several processing units. The method includes performing by a compilation processor the steps of: computing for a particular operation frequency and a particular memory level, a required single-unit memory bandwidth for executing a specified program using one unit of the several processing units, and computing using the single-unit memory bandwidth a maximum number of processing units $N_{max}$, such that using more than $N_{max}$ processing units would exceed an available memory bandwidth at the particular operation frequency and the particular memory level. The method also includes, for each value of a number of processing units N in a range from 1 up to $N_{max}$ estimating using an energy model an energy consumption for executing the specified program using N processing units. In addition, the method includes determining an optimized number of processing units $N_{opt}$ for which the estimated energy consumption is minimum.

Computing the required single-unit memory bandwidth may include computing a stride distance between two consecutive memory accesses associated with the particular memory level from a selected portion of the specified program, and comparing the stride distance with a size of single access at the particular memory level. The energy model may include the number of processing units, and at least one of: an operating frequency of the data processor, an operating voltage of the data processor, a number of computations in a program, an amount of memory at a specified level accessed by the program; power consumed by a unit of the data processor during one computation at a specified frequency, power consumed by a unit of the data processor for accessing one byte of data from a specified level of memory at the specified frequency, and performance of a unit of the data processor at the specified frequency.

In some embodiments, the method includes setting by the compilation processor a degree of maximum parallelization to the optimized number of processing units $N_{opt}$. The method may also include generating by the compilation processor a command directing at least one processing unit to enter a sleep mode when a number of processing units operating concurrently exceeds the optimized number of processing units $N_{opt}$.

In another aspect, a system is provided for optimizing energy consumption of a data processor having several processing units. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: compute for a particular operation frequency and a particular memory level, a required single-unit memory bandwidth for executing a specified program using one unit of the several processing units, and to compute using the single-unit memory bandwidth a maximum number of processing units $N_{max}$, such that using more than $N_{max}$ processing units would exceed an available memory bandwidth at the particular operation frequency and the particular memory level.

The instructions also program the processing unit to estimate using an energy model, for each value of a number of processing units N in a range from 1 up to $N_{max}$, an energy consumption for executing the specified program using N processing units. In addition, the instructions program the processing unit to determine an optimized number of processing units $N_{opt}$ for which the estimated energy consumption is minimum. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to optimize energy consumption of a data processor having several processing units. The instructions may program the processing unit to compute for a particular operation frequency and a particular memory level, a required single-unit memory bandwidth for executing a specified program using one unit of the several processing units, and to compute using the single-unit memory bandwidth a maximum number of processing units $N_{max}$, such that using more than $N_{max}$ processing units would exceed an available memory bandwidth at the particular operation frequency and the particular memory level.

The instructions may also program the processing unit to estimate using an energy model, for each value of a number of processing units N in a range from 1 up to $N_{max}$, an energy consumption for executing the specified program using N processing units. In addition, the instructions may program the processing unit to determine an optimized number of processing units $N_{opt}$ for which the estimated energy consumption is minimum. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 1 depicts Listing 1, illustrating an incorrectly identified power-coherent region in a program;

FIG. 2 depicts a procedure for forming one or more power-coherent regions in a program, according to some embodiments;

FIG. 3 depicts Listing 3, illustrating insertion of Power API calls in a power-coherent region, according to some embodiments;

FIGS. 10A and 108B show the measured energy consumption according to different concurrency and DVFS settings, and predicted energy consumption according to some embodiments for those settings, for the example program SOLVES;

FIGS. 11A and 11B show the measured energy consumption according to different concurrency and DVFS settings, and predicted energy consumption according to some embodiments for those settings, for the example program SAR.

DETAILED DESCRIPTION

Figure 4:
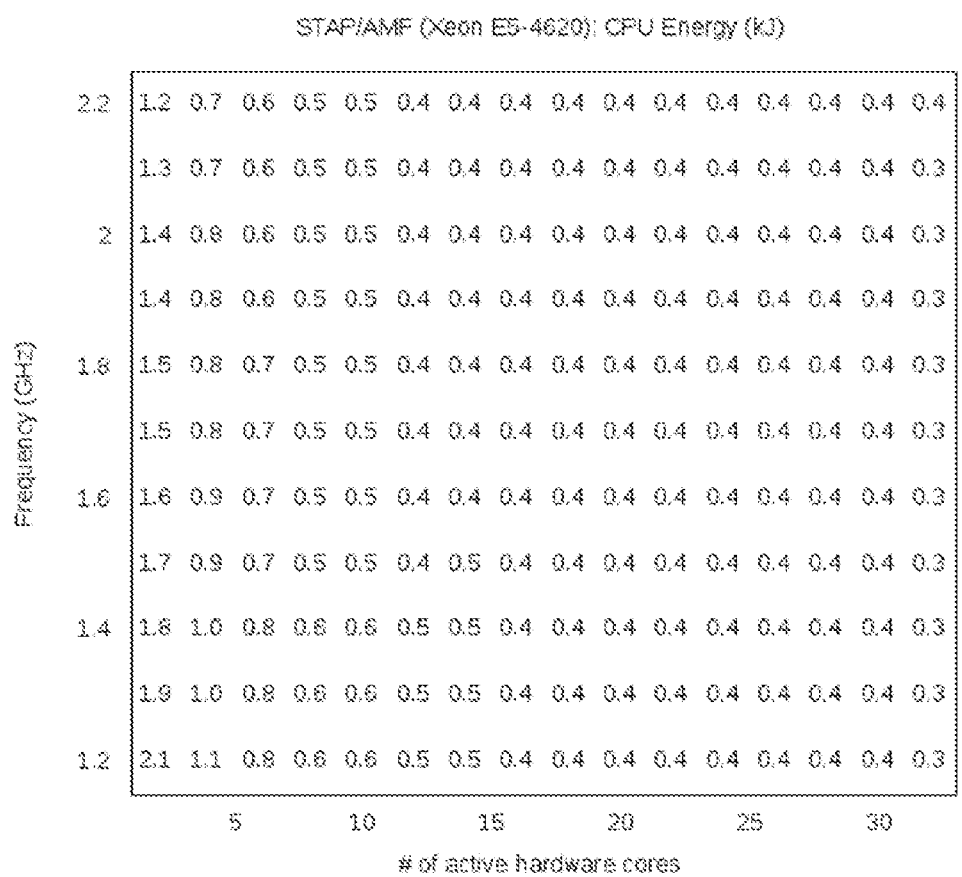
FIG. 4 depicts energy consumption of an example program AMF for several concurrency and DVFS settings of an example computation system used to execute the AMF program.

We assume that the hardware architecture of the target data-processing system (e.g. architectures developed under DARPA Power-Efficiency Revolution for Embedded Computing Technology (PERFECT) program, a parallel processing system, etc.) allows software-controlled voltage and frequency setting, so that operating voltage and/or frequency of one or more processing units of the data-processing system, or another parameter that can affect energy/power consumption, can be controlled or adjusted during the execution of a program. We also assume that the hardware architecture of the target data processor supports power-gating, allowing concurrency throttling, as described below, to be implemented.

Energy Proportional Scheduling

Some compilers, including polyhedral-model-based compilers such as R-Stream™, can exploit the JPLCVD framework (Joint Parallelism, Locality, Contiguity, Vectorization, Data format) to decide which optimizations to apply to programs. Various techniques presented herein for energy optimization may be implemented within the JPLCVD framework of such compilers. Such integration can ensure that other performance objectives targeted by the compiler are not degraded by the energy-centric optimizations. The general scheduling problem solved by the compiler is then extended in various embodiments to also consider energy efficiency, resulting in Energy-Proportional Scheduling (EPS).

Our approach to energy proportional scheduling can incorporate several compiler optimizations such as parallelization, locality improvement, etc., and selection of operating voltage, frequency, and/or another parameter of the computing system, aiming at increasing the energy efficiency of programs for both current and NTV architectures. In particular, however, voltage and frequency are controlled to reduce the dynamic power consumption of processors, and concurrency throttling may be exploited to reduce static power consumption. These two optimizations are based on an energy model that can predict the primary trends in energy consumption using a limited set of parameters available at compilation time. The two combined optimizations improved the CPU energy efficiency by up to 29% during our experiments and are particularly relevant for NTV architectures, as described below.

Our energy model can target looping programs with static control such as those used for digital signal processing. Various procedures and computation algorithms for ISR, signal (image, speech, etc.) processing, radar processing, solution of optimization problems, etc. are within the scope of programs and applications using various embodiments of EPS. The energy-model-based optimizations according to various embodiments can be retargeted easily to different hardware platforms and generally have a deterministic outcome.

Energy Model: Overview

In EPS, both DVFS and concurrency throttling target energy efficiency improvement. In order to determine which of the possible DVFS or concurrency settings will provide the best energy efficiency, the impact of each setting on energy efficiency is predicted in various embodiments.

Distinct CPU voltage-frequency states: Various model parameters depend on a voltage-frequency setting. Unlike a model described in the co-pending U.S. patent application Ser. No. 14/699,876, which considers only low and high voltage configurations the model presented herein considers all of the possible voltage and frequency settings of the target architecture.

Memory bandwidth: In order to properly model the effects of memory boundedness, the model explicitly considers the memory bandwidth available for every memory level. This is especially important for the concurrency throttling optimization described below.

Multicore: By accounting for the number of processors used to execute the program, the model can account for workloads using only a part of the available computing resources. This is often important when modeling the effects of concurrency throttling on energy, as described below.

The energy model used in various embodiments may not exactly represent all the subtle energy variations that may occur during program execution. The goal is rather to model some of the more important effects and to obtain a rough energy prediction that is sufficient for the EPS optimizations to work in typical cases. Moreover, because the energy model is used in a compiler that may perform static program analysis, the model is constructed to be versatile and fast. Additionally, the model uses only a limited number of parameters that are relevant to the different platforms targeted by the compiler and may be fully described at compilation time. Thus, the presented model approximates away various non-essential parameters and generally considers only the important ones, as shown in Table 1.

TABLE 1

Energy model parameters

| Parameter | Description | Unit |
|---|---|---|
| F | Coupled CPU frequency and voltage setting | Hz, V |
| N | Number of processing units (e.g., processors, cores, etc.) | none |
| L | Memory level | none |
| $W^C$ | Number of operations performed | none |
| $W_l^M$ | Amount of memory accessed in memory level l | bytes |
| $P_f^C$ | Power consumed by a floating point operation at f | W |
| $P_{f,l}^M$ | Power consumed when accessing one byte from memory level l and frequency f | W |

TABLE 1-continued

Energy model parameters

| Parameter | Description | Unit |
|---|---|---|
| $FP_f$ | Computational performance at frequency f | s/op |
| $BW_{f,l,N}$ | Memory bandwidth available at frequency f in memory level l when using N processing units/processor cores | bytes/s |

The first tier contains parameters on which other parameters depend. The second and last tiers respectively list software and hardware parameters. Two distinct elements are used in the model: a time predictor and a power predictor. Both power and execution time are also divided into two distinct subcomponents: memory and computations. In some embodiments, it is assumed that every computational operation, or opcode, can be roughly performed at the same speed and has similar power requirements. Regarding memory operations, the CPU power consumption is assumed to be driven by the amount of data transferred in every memory level while the execution time is assumed to depend mainly on the available bandwidth at each memory level. The model finally combines all these elements to provide a CPU energy consumption prediction.

The presented model depends on hardware and software parameters. The hardware parameters model the specificities of the target data-processing system while software parameters describe a program to be executed using the target data-processing system. Several hardware parameters depend on a given voltage and frequency setting f, which allows the effects of DVFS to be accounted for in the model. In some embodiments, we assume that voltage and frequency are tightly coupled, which is often the case in practice. Hardware parameters may also depend on the number of processing units (e.g. cores, processors, etc.), denoted N that are processors used to run the program. The model parameters related to memory may depend on the corresponding memory level, denoted l. The various hardware and software parameters and their roles are listed in Table 1 and may be combined in various embodiments as described below.

The execution time due to computations is computed by:

$$t^C_{f,N} = \frac{W^C \times FP_f}{N}$$

The execution time due to memory accesses in any arbitrary memory level l is computed by:

$$t^M_{f,l,N} = \frac{W^M_l}{BW_{f,l,N}}$$

where $BW_{f,l,N}$ is the bandwidth actually available on memory level l at frequency f when N processing units are used.

Ignoring the potential overlapping of computations with memory transfers, the total execution time is then determined as:

$$t_{f,l,N} = t^C_{f,N} + \sum_l t^M_{f,l,N}$$

$$= \frac{W^C \times FP_f}{N} + \sum_l \frac{W^M_l}{BW_{f,l,N}}$$

The possible power fluctuations that may occur as different operations are performed are ignored in various embodiments. Thus, the power consumptions $P_f^C$ and $P_{f,l}^M$ represent the average power consumption of all the compute and memory operations, respectively. These average power consumption parameters can be directly multiplied by the execution time to obtain the respective energy consumed by the compute and memory operations. The energy consumed on each processing unit may then be computed as:

$$e_{f,l,N} = t^C_{f,N} \times P^C_f + \sum_l (t^M_{f,l,N} \times P^M_{f,l})$$

$$= \frac{W^C \times FP_f}{N} \times P^C_f + \sum_l \frac{W^M_l}{BW_{f,l,N}} \times P^M_{f,l}$$

Finally, in some embodiments, power consumption is assumed to scale linearly with the number of processing units used. Thus, the total energy consumption can be computed as:

$$e_{f,l,N} = \left(t^C_{f,N} \times P^C_f + \sum_l (t^M_{f,l,N} \times P^M_{f,l})\right) \times N$$

$$= W^C \times FP_f \times P^C_f + \sum_l \frac{W^M_l}{BW_{f,l,N}} \times P^M_{f,l} \times N$$

The computed total energy consumption is used in EPS embodiments to predict the effects of the different DVFS and concurrency settings on energy.

Memory Bandwidth

The model parameter $BW_{f,l,N}$ represents the bandwidth available when accessing the memory at level l, using N processors at frequency f. The available bandwidth generally depends on the considered memory level: a cache close to the processor usually has a higher bandwidth than a higher memory level such as the global RAM, for instance. In some hardware architectures, the memory bandwidth is related to the processor frequency. In some cases, the available memory bandwidth decreases as the processor frequency decreases. In some embodiments of the energy model, the available memory bandwidth is parameterized by the number of active processing units. When the available memory bandwidth is large enough, the bandwidth used by a program can increase generally linearly with the number of processing units used to run the program. In such cases, additional processing units can be used to improve performance, e.g., by decreasing the total time required to execute the program via parallelized program execution.

In some cases however, it is possible to reach a limit of the available memory bandwidth and not benefit from the use of more processing units for running the program. This is typically the case when a shared memory bus cannot sustain simultaneous accesses from several processing units. In some embodiments of the energy model, the available bandwidth is accounted for using a parameter that can represent the relationship between the available memory bandwidth and the number of processing units, and yet, is simple so that several possible combinations of frequency, memory level, and concurrency can be computed without incurring a significant burden on the compiler.

Ideally, when the memory bandwidth scales perfectly with the number of processing units used, the bandwidth can be approximated as:

$$BW_{f,l,N} \approx N \times BW_{f,l,1}$$

In that case, we consider that, even though each processing unit can only access a limited memory bandwidth, the overall bandwidth is infinite and can scale as needed with the number of processing units. However, in reality, the available memory bandwidth is bounded and, often, the limit can be reached when using only a small number of processing. This approximation can be represented as:

$$BW_{f,l,N} \le \min(BW_{f,l,1}, =N, BW_{f,l,Nmax})$$

This approximation is generally valid when the size of the shared resource such as the size of a main memory, network input/output capacity, storage disc capacity, etc., is fixed. It may also be valid when the size of the shared resource such as a distributed memory, can vary with the number of processing units. The size of distributed memory generally increases as the number of processing units increases, but the available bandwidth may not increase once the processing system includes a certain number of processing units.

Although this approximation can slightly reduce the accuracy of the energy model, it can simplify parameter instantiation. Indeed, when considering the approximated parameter, only the two values $BW_{f,l,1}$ and $BW_{f,l,Nmax}$ need to be measured and/or characterized per memory level and frequency of a target architecture. The approximation can thus reduce considerably the efforts needed to characterize a new machine and can improve the usability of this available bandwidth parameter for architectures having several (e.g., 2, 6, 10, 20, 50, 100, etc.) processing units.

Parameter Instantiation

As described above, different embodiments of the energy model are parametrized by several software and hardware parameters. These parameters need to be instantiated in order to use the model and to predict energy consumption of programs. The parameters themselves depend on some fundamental properties of the targeted platform such as operating frequency (f) (and/or operating voltage), the number of processing units (N), and the memory level (l). These fundamental parameters are generally known for a specified hardware architecture to be used for executing the program.

The hardware parameters in the model include $P_f^C$, $P_{f,l}^M$, $FP_f$, and $BW_{f,l,N}$ which, after the approximation presented earlier is summarized into $BW_{fu}$ and $BW_{fl,Nmax}$. The first two parameters summarize the power consumption of the architecture. One way of evaluating $P_f^C$ and $P_{f,l}^M$ is by directly measuring them on actual hardware while running simple benchmarks. The procedure can be greatly simplified if an energy probe is embedded in the platform. As an alternative, an average power consumption can be estimated through simulation and micro-benchmarking. The computational performance $FP_f$ can also be measured, or can be derived from the machine specifications. The memory bandwidth parameters can be measured using a realistic memory intense benchmark. The available memory bandwidth may have a high variability. While the memory bandwidth parameters can be determined in some embodiments, using optimized stream benchmarks or by computing theoretical bandwidth from the architecture specifications the values thus obtained may not accurately represent the average performance of the memory subsystem on some target architectures. Accurate parameter values can be obtained, however, using memory-intensive benchmarks The model is also parameterized by the software parameters $W^C$ and $W_l^M$. These parameters can be computed by the compiler (e.g. R-Stream™) when a program is to be compiled and optimized. In some embodiments, the compiler can generate and analyze a polyhedral model of the program to deduce the values of these two parameters.

The first parameter to instantiate, $W^C$, is the number of arithmetic operations. In the polyhedral model, this quantity can be determined at compilation-time as an Ehrhart polynomial in some embodiments. However, in some cases, this polynomial is expensive to compute and approximations may be used. R-Stream™ includes several techniques for evaluating Ehrhart polynomials and can compute or accurately estimate $W^C$.

The other software parameter, $W_l^M$, requires a determination of the amount of data accessed at one or more levels of the memory hierarchy. In general, this can be difficult to compute accurately because of the complexity of modern memory architectures. Indeed, one or more memory levels may be shared across a distinct subset of processing units. Different memory levels may implement schemes, elaborate coherency and consistency policies, and may employ different prefetching schemes, among other intricacies. As such, we describe a compiler heuristic for approximating $W_l^M$ in EPS. The following approximation are used to allow a compiler to quickly estimate $W_l^M$.

First, the memory step (stride) of two consecutive array accesses in a loop nest may be approximated by the memory step (stride) corresponding to two consecutive iterations of the innermost loop encompassing the array access. Second, at a particular level l of memory hierarchy, if two consecutive array accesses can be performed within a single bulk transfer to that memory level (e.g., within a single cache line, if the memory level is cache) it is assumed that all the accesses performed by the considered array reference are performed at that memory level l; otherwise, all the memory accessed by the considered reference is assumed to be fetched from the next level of memory (i.e., memory level l+1) in the memory hierarchy. In describing this heuristic, the term array is used for the sake of convenience only. The heuristic is applicable to any data structure.

The heuristic is based on the following principles: because of the linear memory accesses typically found in the polyhedral model, hardware prefetchers can be expected to perform well on the considered programs. Thus, when the memory step (stride) is small, the bandwidth of a memory level close to the processing units (e.g., a cache memory) can be expected to be utilized, in part due to spatial locality and prefetchers. On the other hand, prefetchers usually work well for small memory steps (strides) and can typically prefetch only a few accesses ahead. Moreover, locality can degrade when large memory steps (strides) are involved. Thus, memory accesses with larger steps are expected to involve higher levels of memory (e.g., the main memory). This heuristic can approximate the actual hardware behavior and may allow the compiler to quickly compute a precise-enough value for $W_L^M$. In particular, the heuristic is generally sufficient to distinguish a common cause of inefficiency in memory accesses, i.e., large memory steps or strides.

In different embodiments, the overall parameter instantiation can occur during two distinct phases. First, the hardware parameters may be specified by the user once for every considered platform. These parameters have been measured, simulated, or may have been deduced from design documentation. Second, when a program is compiled, the compiler can compute the appropriate value of the software parameters, e.g., using a polyhedral representation. In various embodiments, these parameters are combined to predict an energy consumption of the program being compiled.

Various embodiments of the energy model described herein can be used by DVFS and/or concurrency throttling optimizations. Different embodiments of the energy model can provide rough insights on the effects of different settings of operating frequency and/or operating voltage on the energy consumption of the program during execution thereof. In various embodiments, these insights are sufficient to determine an efficient hardware configuration to be used as the program runs.

Dynamic Voltage and Frequency Scaling

In some embodiments, DVFS allows the input voltage and/or clock frequency to be changed while a processing unit is running. Various EPS embodiments allow DVFS to be significantly improved in the PERFECT architecture in terms of granularity, using transition speed, and its effect on energy optimization. In some embodiments, a compiler can exploit energy saving opportunities via DVFS using Power API calls inserted in an optimized program generated by the compiler by modifying the original program. Controlling the voltage and/or frequency from programs themselves has several advantages over a classical OS-driven DVFS control: it allows proactive control, accurate settings can be chosen because the expected workload may be analyzed at compile time, and the overall process can be more deterministic relative to run-time determination of the voltage and/or frequency settings, in part because the decisions are triggered by the program execution flow.

A compiler according to some embodiments can select any of the operating frequencies available in the target hardware architecture group or sequence of instructions. To do so, a two is described below. In the first step, sequences/groups of instructions expected to have a similar reaction to DVFS are identified. These groups are called power-coherent regions. During the second step, the compiler selects the frequency and/or voltage setting expected to provide the maximum energy efficiency for the identified regions.

Power-Coherent Regions

Power-Coherent Regions can be sequences of contiguous instructions in the program. They represent an atomic scheduling unit for DVFS because any power-coherent region is generally executed using a single frequency and/or voltage setting. When extracting power-coherent regions from programs, two objectives may be achieved simultaneously. First, the regions can be made as large as possible in order to limit the number of DVFS switches during the program execution. Indeed, each voltage and frequency switch usually has a non-negligible cost. Second, because a single frequency and voltage setting may be used for the whole region, the instructions within the region should generally be as coherent as possible with regard to DVFS. The number of possible sets of power-coherent regions can combinatorially increase with the number of instructions in the program. Therefore, a compiler according to some embodiments uses a greedy heuristic to build the power-coherent regions, searching for the largest and most coherent regions in the program, as described below.

At the beginning, every program instruction is included in its own distinct region. Then, the regions are fused as much as possible as long as the fusion is expected not to transform a generally compute intense region into a generally memory intense region or vice-versa. At this stage, the arithmetic intensity of a power-coherent region may be estimated based on the count of computations and memory operations inside the regions. In various embodiments, care is taken to not fuse a region with only a subset of the instructions in sub loops. As illustrated in Listing 1, shown in FIG. 1 such partial fusion can result in an incorrect frequency and voltage setting to be chosen for some of the instructions in the region, and it is generally incorrect to only change and restore the DVFS setting at the boundaries of such region. In compiler terms, the entry of a region must dominate the region exit, the region exit must post-dominate the region entry, and the region must have a single entry and exit. The power-coherent region formation procedure is illustrated in Listing 2, shown FIG. 2. Once all the power-coherent regions are built, frequency and voltage settings can be chosen for each one of them.

Among the power-coherent regions built, some may include only a few instructions. As a result, if Power API calls were generated at the region boundaries to set and reset the DVFS setting, the system call overhead can be too large and may not be compensated by the benefits of the better DVFS setting. To avoid such situations, the power-coherent regions determined as being too small (e.g., having no more than a minimum number of instructions) are ignored in the rest of the process. The instructions in such regions may be executed using a default frequency. In some embodiments, the default frequency can be the maximum available operating frequency. In some embodiments, a region is considered too short if it is expected to run fewer than 10 times the duration required to apply a new DVFS setting. This heuristic can eliminate many small regions that may otherwise remain in the transformed programs and can limit the overhead due to DVFS.

Frequency Selection

Once power-coherent regions have been formed, the setting to apply during the execution of the instructions in the region may be determined. In order to predict the energy consumed while executing the instructions in a region corresponding to different power settings, some embodiments of a compiler can exploit the energy model described above. The energy resulting from several operating frequencies and/or voltages may be evaluated for each power-coherent region and the setting that minimizes the energy consumption is applied for the whole region. In practice, only a few regions may encompass all the computations performed in a function, method, or procedure of a program and a limited set of frequency and voltage settings may be available for the target architecture. Thus, the resulting set of configurations to evaluate is often limited and, because the model can be evaluated quickly and without needing run-time or profile-based information, the induced compiler overhead is negligible, in various embodiments. In some embodiments, the compiler can optimize/minimize an energy delay product associated with a power-coherent region. To this end, the compiler may use the estimated time of execution, as described herein.

As a final step, in some embodiments, Power API calls are generated at the power-coherent region boundaries, as illustrated in Listing 3, shown in FIG. 3. The generated API calls set the frequency and/or voltage predicted to minimize energy consumption just before the region execution. The inserted function calls exploit the capabilities of a new version of the Power API. An optional API call at the end of the region can reset the voltage and/or frequency to respective default values such as the maximum, minimum, or median frequency and/or voltage.

Corrective Power API Calls Removal

Power API calls are typically generated at the region boundaries but, as illustrated in listing 3, it is common that two regions are close to each other during the program execution. The closeness can be described in terms of time gap between the execution of the two regions and/or the number of instructions between the two regions, etc. In that case, it may not be necessary for the voltage and/or frequency to be reset because a new setting will be applied soon after the execution of the previous region terminates. In order to avoid generating such Power API calls, some embodiments of a compiler perform a control flow analysis to remove such superfluous calls to the Power API. As a result, when the reset call is removed, the frequency set at the beginning of the first region remains active until the beginning of the next region.

Concurrency Throttling: Overview

Some embodiments of the compiler implement concurrency throttling. While DVFS focuses on reducing dynamic power consumption by adding Power API calls in the program after it has been optimized and parallelized, concurrency throttling can target static power consumption and may be integrated within the JPLCVD framework of a compiler such as R-Stream™. The goal of concurrency throttling is to predict starvation situations and exploit them to reduce the static power consumption. For various technical or economic reasons, shared hardware resources are often provisioned according to an average usage scenario and can become the limiting factor for performance when they are used more intensively. A typical example is the memory bandwidth, which usually becomes the bottleneck if many processing units simultaneously attempt to access memory. In such situations, even a fully parallel program cannot be accelerated when using a large number of processing units, because one or more processing units need to idle while the shared resource becomes available to such processing unit(s). Thus, it may be preferable to let some of the processing units enter into a sleep state in order to save power as long as the starvation persists.

For the sake of convenience, the concurrency throttling optimization is described with reference to the memory hierarchy as the shared resource. However, the techniques described herein can be applied to other shared resources such as processing system I/O, network access, storage, etc. In some embodiments, a compiler can use the bandwidth model that is part of the energy model used for EPS to predict the starvation situations with respect to one or more memory levels in the memory hierarchy, and can determine the optimal number of processing units to use in a parallel section of the program.

Number of Processors

A suitable level of concurrency to use for a program may not depend solely on the exploitable bandwidth. Indeed, reducing the concurrency may not only reduce the bandwidth usage but may also impact the performance of computations and power and energy consumption. Thus, the suitable concurrency is often a balance between the pressure on shared resources, the computation throughput, and power and energy consumption. In some embodiments, a compiler performs such a balancing based on the predictions using an embodiment of the energy model used for DVFS: all the possible configurations are evaluated in order to predict which concurrency level may lead to the minimal energy consumption.

For example, consider a computing system that includes $N^T$ processing units/cores, and assume that a program was compiled to be executed in parallel using the $N^T$ cores. According to some embodiments, a compiler using an embodiment of our energy model can determine that during the execution of a certain power-coherent region, the available bandwidth at a memory level l will be consumed when $N_{max}$ cores are executing the program simultaneously, where $N_{max} < N^T$. As such, the compiler may direct the runtime environment of the processing system to throttle up to $(N^T - N_{max})$ cores, i.e., place those cores into a sleep or an equivalent mode during the execution of that particular power-coherent region.

In some embodiments, the compiler may determine based on an embodiment of the energy model that relative to using $N_{max}$ cores, the energy consumption using only $N^1$ cores, where $N^1 < N_{max}$, may be significantly less (e.g., less by 5%, 8%, 15%, 20%, 35% or more), while the relative performance degradation is not significant (e.g., less than 1%, 2%, 5%, 10%, 20%, etc.). As such, the compiler may direct the runtime environment to throttle up to $(N^T - N^1)$ cores. The compiler can suggest, based on the expected processor load, cluster or network structure, etc., which particular processing units/cores to throttle. Optionally or in addition, the runtime environment may determine, e.g., based on the observed processor load, cluster or network structure, observed contentions therein, etc., which cores would be throttled. In some embodiments, the limits such as $N_{max}$ and/or $N^1$ can be determined at compile time and the compiler can set the maximum degree of parallelization according to those limits. As, a single energy model is used by DVFS and concurrency throttling, both, in some embodiments, both static and dynamic power/energy consumption can be optimized.

The number of possible configurations may be large, especially if there are numerous frequencies or processor cores. The evaluation of each setting, however, may require only a few arithmetic operations. If the configuration space to be explored becomes too large, requiring long compilation times, sampling may be used to find a solution.

Enforcing Concurrency

There are several ways to enforce a degree of parallelism, even within a single parallelization backend. For instance, in OpenMP, a parallel loop can be augmented by a dedicated pragma option to specify the number of threads to use, or a system wide setting can be applied, or parallel programs can be built such that parallel loops have exactly as many iterations as the desired parallelism degree. In some embodiments of R-Stream™, the latter solution is used to enforce concurrency throttling. Compared to other solutions it has the following benefits. First, the degree of parallelism is described at the scale of a parallel loop, as opposed to the whole program or system. Second, it ensures a good load balancing because the compiler can optimize the program specifically for the chosen degree of parallelism. These strategies can be implemented on other parallelization runtimes.

Results

Embodiments of the energy model described herein can take into account high level hardware parameters associated with the computing system to be used for executing a program. In different embodiments, the energy model can also account for certain high-level software parameters that can be computed at compile time without incurring significant (e.g., more than 1%, 2%, 5%, 10%, etc.) burden. Various compiler embodiments can also account for the saturation of shared resources (e.g., memory bandwidth) and/or the effect of the number of active processing units/ cores on power and/or energy consumption. In various embodiments, the model can be used to determine a suitable voltage, frequency, or another power/energy-affecting parameter and/or a concurrency level, expected to minimize power/energy consumption. The chosen concurrency level can be accounted for in the JPLCVD framework of some embodiments of a compiler to achieve load balancing and optimized performance.

Experimental Setup

The server platform used to perform the experiments includes 4 Intel Xeon E5-4620 processors. Each processor has 8 cores and 16 hardware threads, running at 1.2 GHz to 2.2 GHz. The memory on the server includes in dual channel 1333 MHz DDR3 modules. The system runs Ubuntu Linux™ with a 3.13.0-53 kernel. All the evaluated programs, after having been optimized by embodiments of R-Stream™ were subsequently compiled using gcc 4.8.2 with the O3 optimization flag. In the presented results, the parallel loops created by R-Stream™ are run using OpenMP™ configured to use passive waiting and pin software threads to processors. Such configuration is chosen for its relevance with regards to energy efficiency and measurement stability. All the presented energy measurements were performed using the RAPL energy probes embedded in the processor.

Two new optimization techniques aimed at exploiting voltage and/or frequency settings and power gating are described above. These new techniques may allow a compiler, e.g. R-Stream™, to exploit the nimble frequency/voltage controls that may be available on PERFECT and other parallel processing architectures. We demonstrate that using an energy model an efficient hardware configuration schedule can be determined at compilation time. The hardware configuration schedule may include frequency and/or voltage settings and optionally, a concurrency level relevant to the program to be executed on the target architecture. Energy savings achieved on Space-Time Adaptive Processing (STAP) and Synthetic Aperture Radar (SAR) back-projection algorithms are illustrated.

The energy results are presented for two reference programs: STAP and SAR. STAP has the following computations: (1) Doppler processing, (2) covariance estimation, (3) linear system solver, and (4) adaptive matched filter (AMF) weighting. We analyzed covariance estimation (COVAR), linear system solver (SOLVES), and AMF weighting computations (AMF). These kernels have different characteristics that makes them good candidates for demonstrating the abilities of a compiler according to different embodiments in different contexts. In particular, compilation of the kernels involve distinct optimizations such as loop fusion, tiling, improving memory locality, loop parallelization, etc., that may be performed by a compiler such as R-Stream™, and have different arithmetic and memory intensities, which result in a whole range of energy consumption profiles. A large input dataset was used when running the program kernels and each program kernel was run several times in order to measure relevant and stable energy consumption.

Energy Maps

In order to determine how a kernel reacts to all the possible DVFS and concurrency throttling settings, we ran them all using a large range of settings. In the various runs performed, we varied the number of threads used and the voltage and frequency setting. The number of threads used to run the kernel is not set at the runtime level; a new version of the kernel is specifically generated for every concurrency level. This procedure can limit the side effects induced by load balancing when the different number of threads are used to parallelize the loops. Moreover, the different versions are all generated by an implementation of R-Stream™ so that the energy measured reflected the effect of choosing a concurrency level. In some experiments, both DVFS and concurrency are set at the beginning of the kernel execution and are left unchanged for the whole execution. This is not representative of all the possible configurations a compiler can generate because, depending on the number of parallel loops and the number of power-coherent regions built, various different power settings can be applied as a program runs. This experiment illustrated, however, the main consequences of various available voltage, frequency and thread settings on energy consumption.

In the following figures, the total CPU energy consumption of each kernel is represented using a grid for every concurrency and frequency setting. The presented heat-maps visually describe the implications of the different settings on energy consumption. Each tile in the map represents a different configuration, and a value in the tile represents the corresponding energy consumption. Moreover, the heat-maps present energy consumption, not power consumption. Thus, higher energy consumption values may be observed when using fewer cores or a lower frequency because the execution time increased more in proportion to the amount of power saved.

STAP

The first kernel is the AMF kernel extracted from STAP. In the case of AMF, the energy profile shown in FIG. 4 highlights the low sensitivity of the kernel to DVFS: energy consumption generally varies with frequency only when all the cores or only a few of them are used. However, it is clear that running this kernel with less than 16 cores can result in a high energy consumption. Using all the processors for this kernel is the most energy efficient configuration. In the energy profile presented for AMF, one can see that energy consumption generally increases as the frequency is increased. This behavior is expected and reflects cases where the slowdown induced on the program is higher than the power saved to the decreased frequency. Such situation is also reflected in the increased energy on the left of the heat-map where only a few cores are used. Similar cases can also be found in other experiments.

Figure 5:
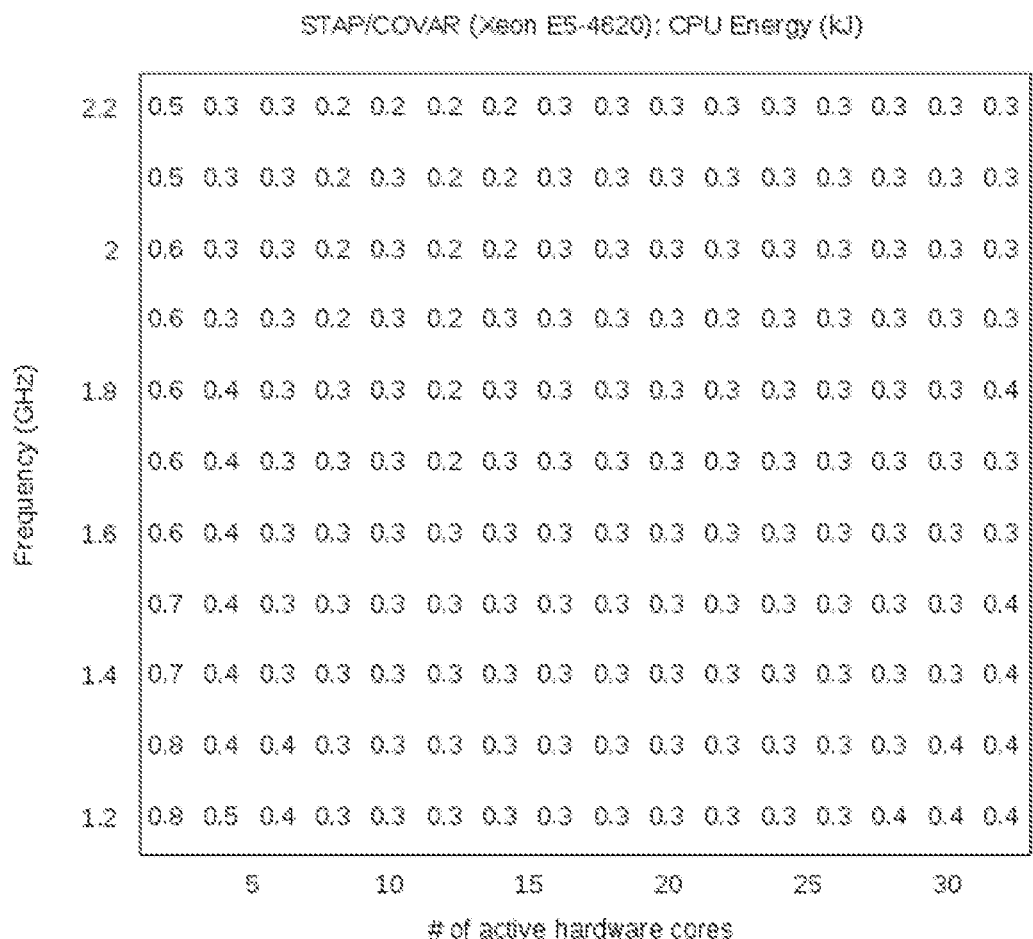
FIG. 5 depicts energy consumption of an example program COVAR for several concurrency and DVFS settings of an example computation system used to execute the COVAR program.

An energy profile of the second kernel extracted from STAP, COVAR, is presented in FIG. 5. In contrast to AMF, COVAR was more efficient when only a few of the available processor cores were used. Such behavior can be expected when the arithmetic intensity of the program is low. Because of low arithmetic intensity, the memory bandwidth, shared by all the processors, can become the bottleneck and using more cores may increase the contention and power consumption.

Figure 6:
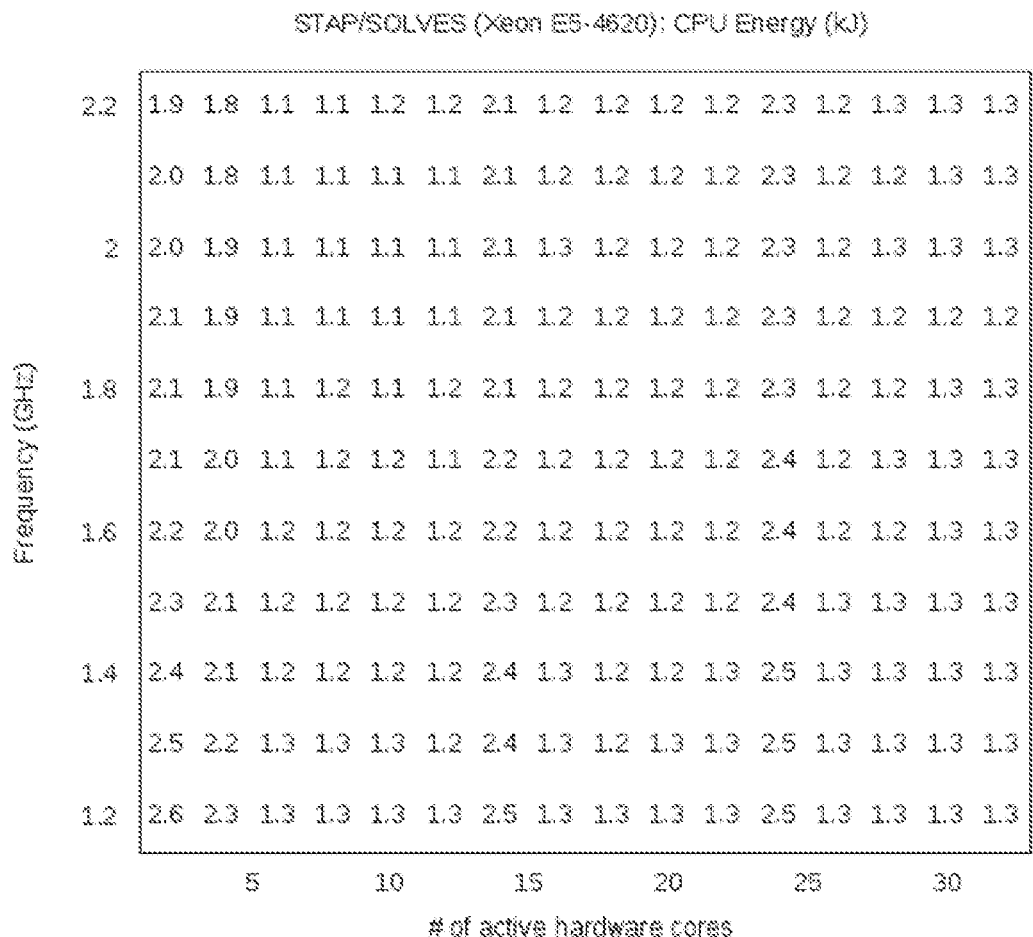
FIG. 6 depicts energy consumption of an example program SOLVES for several concurrency and DVFS settings of an example computation system used to execute the SOLVES program.

The last STAP kernel, SOLVES, is presented in FIG. 6. Its energy profile is also distinct from the other kernels. As can be seen in FIG. 6, using 14 or 24 cores leads to a much higher energy consumption than the neighboring settings. Those high energy singularities are not associated due to an increased power consumption but are due to increased execution times compared to the neighboring settings. Such situation typically occurs when the loop nest built for the program is poorly load balanced whereas a good load balance can be achieved with other concurrency levels. Interestingly, the optimal energy setting for SOLVES is when 8 cores are used but using fewer processor cores can lead to a large energy consumption.

SAR

Figure 7:
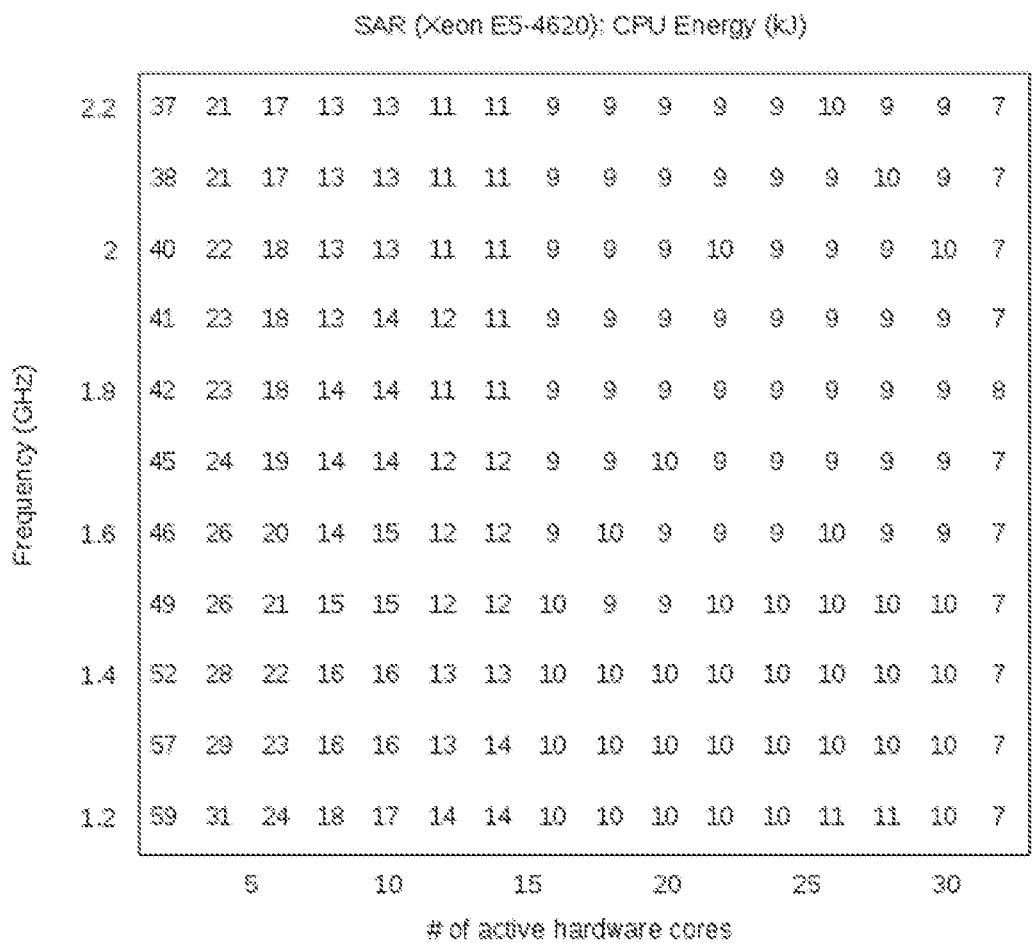
FIG. 7 depicts energy consumption of an example program SAR for several concurrency and DVFS settings of an example computation system used to execute the SAR program.

FIG. 7 is the energy profiled measured for SAR. It is similar to that of AMF, although the energy variation favors the use of maximal concurrency. These experiments show that concurrency throttling has a high impact on energy consumption. DVFS, however, cannot be left aside in order to reach the optimal energy setting.

Model Accuracy

We presented the actual energy consumption of the considered kernels. Such profiles can accurately describe the energy consumption of programs under various possible lower settings. Obtaining accurate energy profiles took several hours and hundreds of runs of the kernels on the target platform. This is significantly erroneous, if not infeasible at compilation time and, as such in various embodiments a compiler choses which setting to use based on an energy model presented earlier. The energy model is expected to provide a fast approximate but accurate relative order of all the possible power settings.

The energy model used in EPS has been evaluated in order to determine its accuracy. Considering the numerous approximations in the model and in the parameters used to model the processor, exact energy predictions are not expected. On the other hand, a correct relative ordering of the possible settings is highly desirable. Moreover, having energy efficient settings predicted to be close to the actual efficient settings is also important. FIGS. 8 through 11 compare the actual energy profile of each kernel with the energy profile predicted by an embodiment of the energy model used in EPS.

Figure 8A:
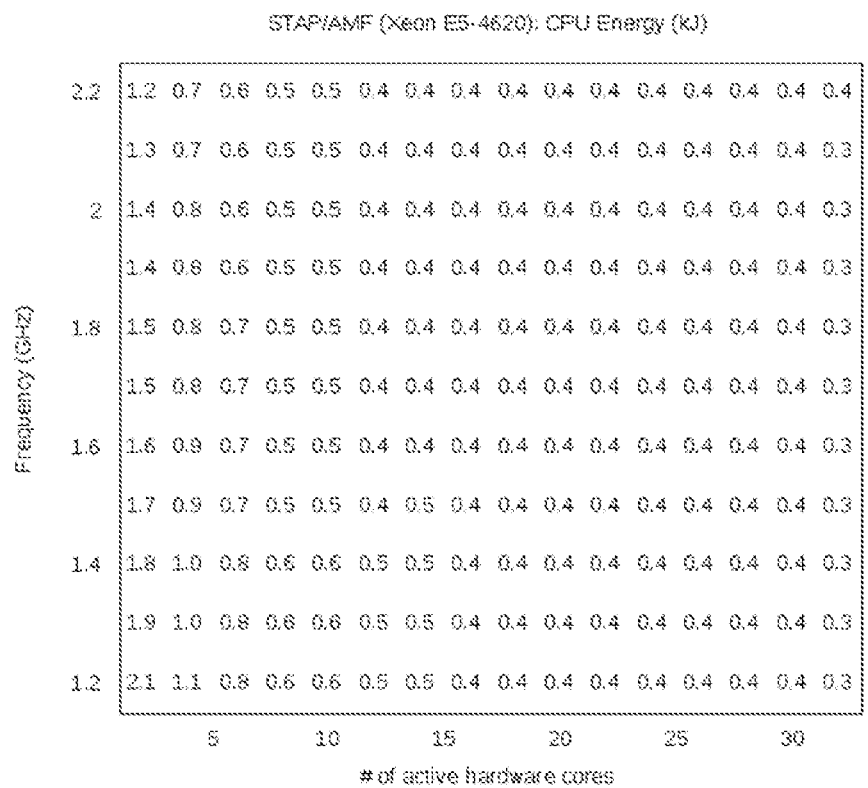
FIGS. 8A and 8B show the measured energy consumption according to different concurrency and DVFS settings, and predicted energy consumption according to some embodiments for those settings, for the example program AMF.
Figure 8B:
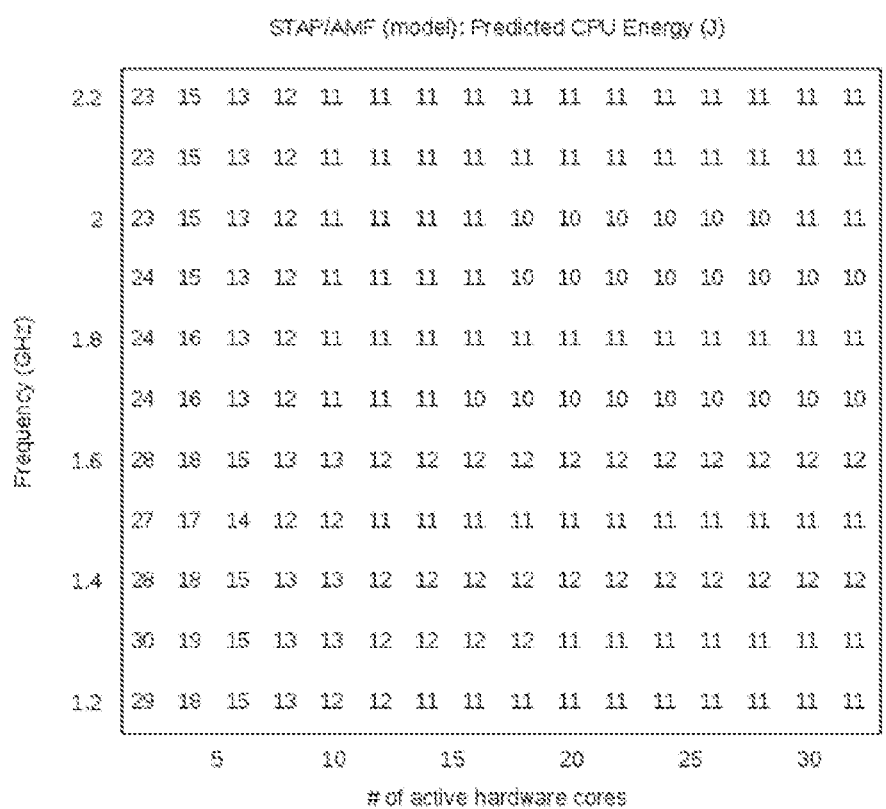

In FIGS. 8A and 8B, the energy profile predicted for AMF using an energy model (FIG. 8B) is compared with its actual energy profile (FIG. 8A). The global aspect of the profiles indicate a close but not perfectly accurate prediction. Based on the experiments described above, many power settings have been measured to be only slightly worse than the most efficient power settings. While, the approximations used in the energy model may not be highly useful in finding the optimal setting at a fine granularity of settings, the model is sufficiently accurate to distinguish the very inefficient cases where only a few processors are used, from the more efficient ones.

In the case of AMF, the predicted energy consumption according to one embodiment of the energy model is imprecise by one order of magnitude. The relative ordering, however, is accurate and, as such, the decisions made by the compiler as to which power setting may be most suitable than others can be accurate.

Figure 9A:
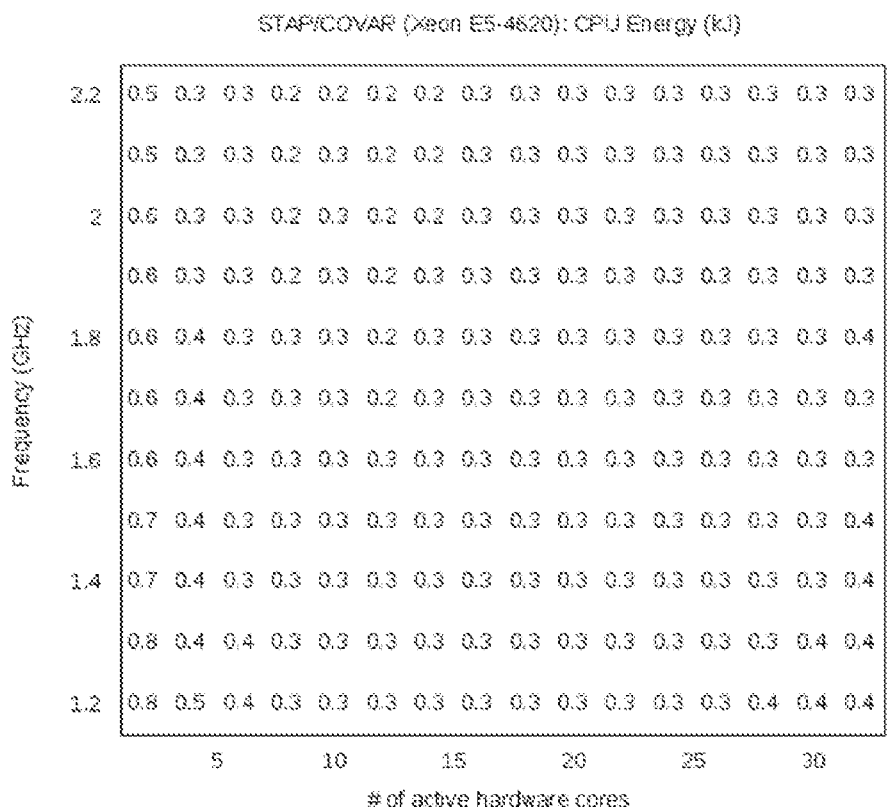
FIGS. 9A and 9B show the measured energy consumption according to different concurrency and DVFS settings, and predicted energy consumption according to some embodiments for those settings, for the example program COVAR.
Figure 9B:
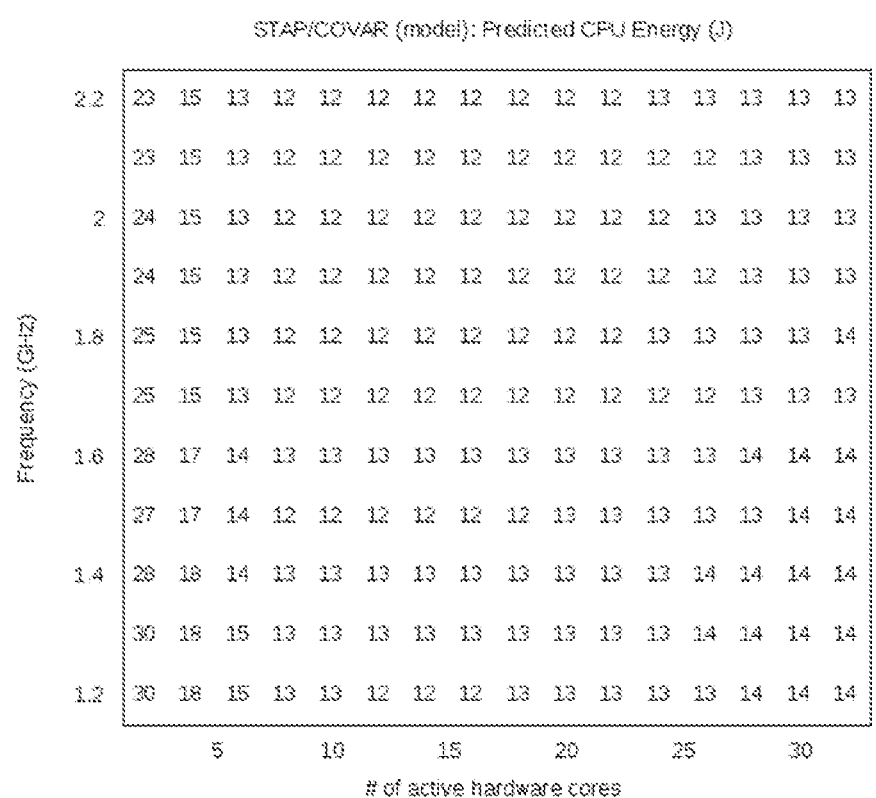

The energy model is evaluated for COVAR as shown in FIG. 9A, showing measured energy values, and FIG. 9B showing the energy values predicted by an embodiment of the energy model. In the case of COVAR, the energy-model-based predictions are accurate, matching the measurement obtained via the experiments described above. The model correctly weights the inefficient configurations and it also correctly predicts the lowest energy consumption for all the settings close the actual best setting. For this kernel, even the subtle effects of DVFS at high concurrency were correctly predicted by the embodiment of the energy model.

Figure 10A:
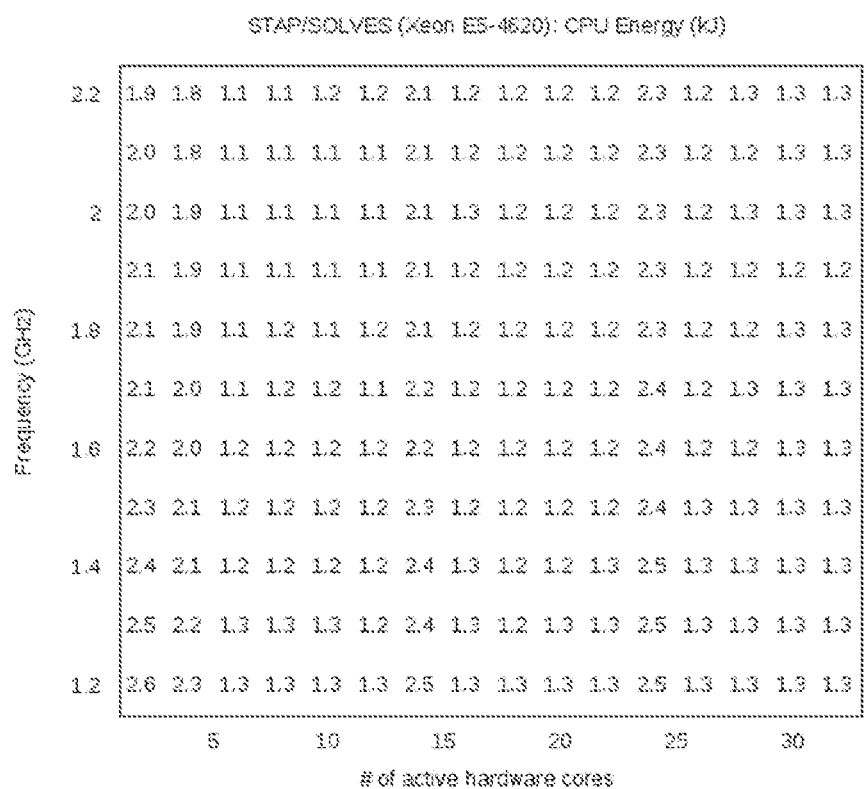
Figure 10B:
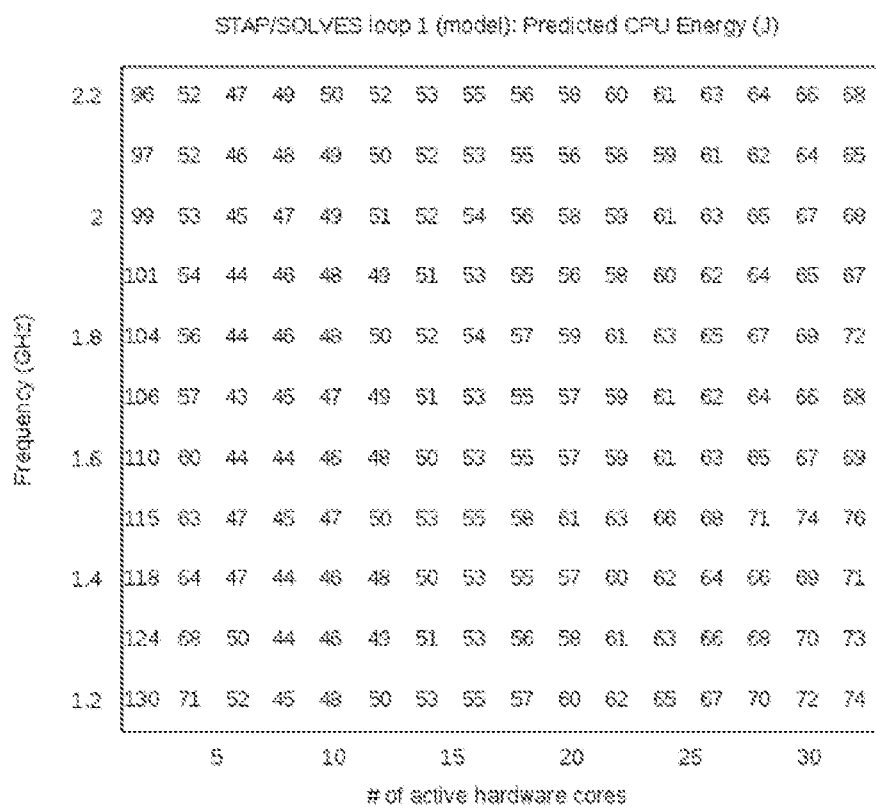

Similar results are shown for SOLVES, where FIG. 10A shows the measured energy values and FIG. 10B shows the energy values predicted using an embodiment of the energy model. SOLVES exhibits inefficiencies for some concurrency levels because of poor load balancing. The embodiment of the energy model assumes linear scaling of the computational part of the programs, and does not predict such singularities. Second, the energy efficiency of SOLVES improves as the concurrency decreases, until reaching 4 processor cores where the efficiency abruptly worsen. Such effects are correctly captured by the model.

Figures 11A, 11B:
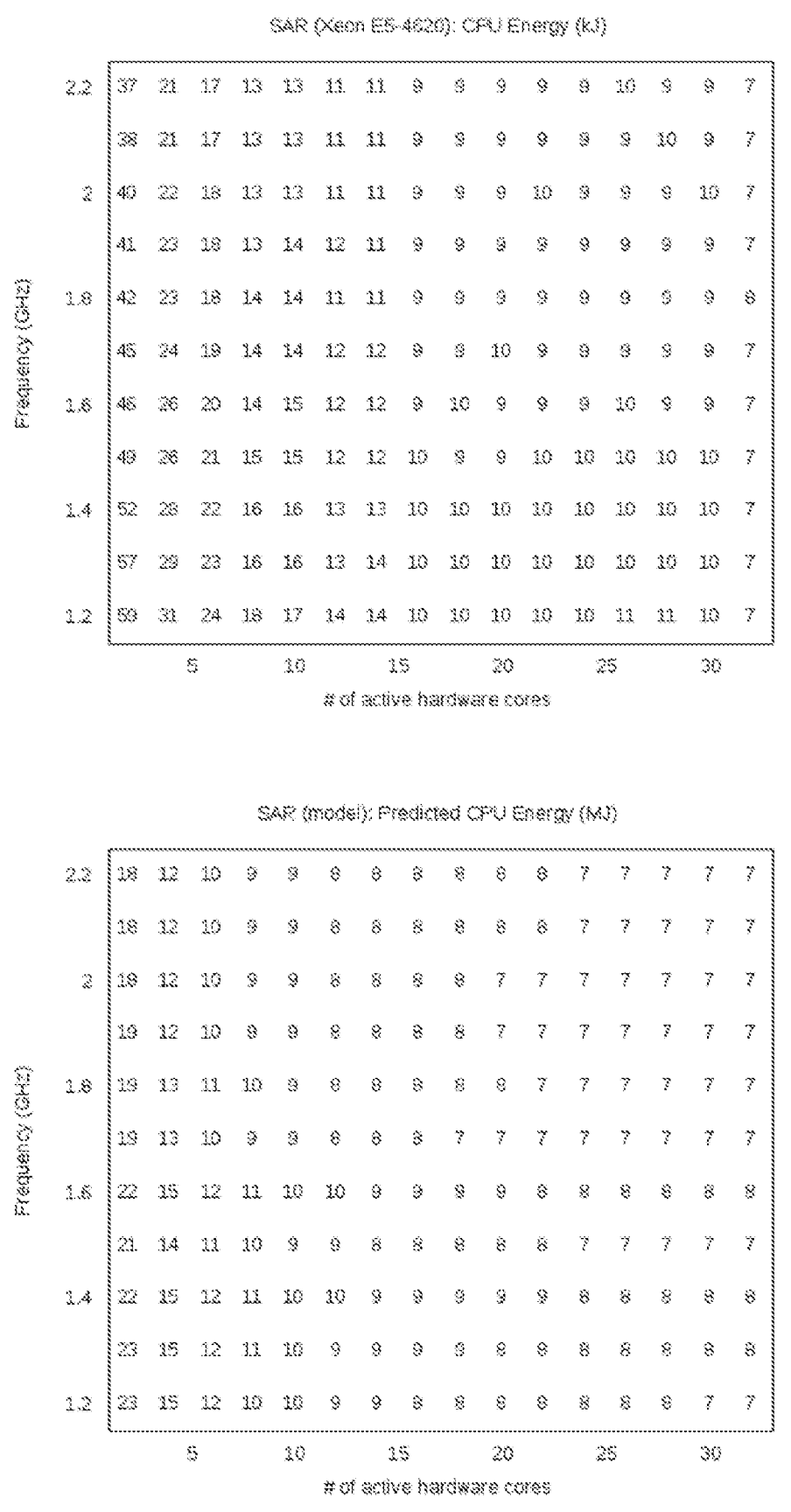

Finally, the energy consumed in SAR, as shown in FIG. 11A has also been compared to its predicted values shown in FIG. 11B. Because the profile of SAR and AMF are similar, the energy model is expected to perform similarly. However, it can be seen from the figure that, because the various power settings lead to more distinct energy consumptions with SAR, the model also tends to distinguish better the effect of different power settings. In this case the inefficient settings are identified by the model and the efficient settings are correctly valued by a low energy consumption.

In conclusion, various embodiments of the energy model perform well over the various cases. While some embodiments cannot predict absolute energy consumption, they are accurate enough to find an efficient configuration among all the possibilities. This illustrates that the energy model used in EPS may be sufficient to perform an accurate selection of a DVFS setting and concurrency level, even in the presence of errors in parameters instantiation.

Energy Savings

The energy savings obtained by EPS were measured on the experimental platform. In Table 2, the execution time and energy consumption of each program is compared in two different settings. For each program, we ran the program generated by R-Stream™ with EPS and compared it to the program originally generated without EPS, using the maximal frequency. The execution time is not expected to be improved with EPS. In fact, because fewer processors and a lower frequency may be used, the execution time can increase with EPS. The reference version execution used all the cores and the execution occurred at the maximal frequency, which is the default configuration in Linux™ operating system because the default DVFS controller choses the highest frequency for all the programs.

The energy savings are related to the energy model accuracy. Energy can be saved in many cases, demonstrating the ability of the generated program to actually exploit efficiently, and beneficially, the chosen configuration in terms of operating frequency and/or the number of cores and/or concurrent threads.

TABLE 2

Execution time and energy comparison

| | R-Stream No EPS | | R-Stream EPS | | Difference | |
| --- | --- | --- | --- | --- | --- | --- |
| | Time(s) | Energy(J) | Time(s) | Energy(J) | Time | Energy |
| AMF | 1.8 | 350 | 2.6 | 372 | +44% | +6% |
| COVAR | 3.1 | 343 | 2.3 | 244 | −25% | −29% |
| SOLVES | 12.4 | 1273 | 12.3 | 1130 | 0% | −11% |
| SAR | 28.8 | 6909 | 36.2 | 6585 | +26% | −5% |

Table 2 shows execution time and energy comparison of the kernels optimized with EPS compared to running on all the cores at the maximal frequency. The maximal frequency is chosen by the default DVFS controller on Linux® operating system. In the case of AMF, a slightly less efficient configuration was chosen compared to the reference determined via extensive experimentation. The configuration chosen for COVAR illustrates how EPS at compile time can increase the energy efficiency. The execution time of COVAR was measured and was found to decrease. Such speedup can be considered as a positive side effect of the reduced pressure on the shared resources. On an average, in various embodiments, EPS can increase at the compile time the energy efficiency of programs to be executed on a target platform.

Projection at NTV

Near-Threshold Voltage operation is expected to significantly increase the energy efficiency of processors and is a part of the primary focus for the PERFECT architectures. The energy savings provided by NTV architectures have however some well-known challenging consequences. In particular, the processor frequencies are expected to be reduced by an order of magnitude, the performance variability across the processor cores may significantly increase, and the hardware reliability may worsen.

As described above, a compiler may ignore the smallest power-coherent regions because of the slow frequency and voltage transitions in typical hardware platforms. DVFS transitions may be improved in near-threshold computing, in particular in terms of transition speed. Providing nimble voltage and frequency control can be particularly important at NTV because fine-grain DVFS is one of the techniques expected to reduce the variability of NTV processors. Nimble voltage and frequency controls are beneficial to EPS and, as such, some embodiments may allow even the smallest power-coherent regions to be exploited.

Leakage and dynamic power generally have an equivalent importance in many architectures but leakage power is expected to take more importance in some NTV architectures. The greater importance of leakage power can increase the potential benefit of concurrency throttling. Moreover, we emphasis two consequences of NTV: caches are expected to require a higher voltage than the computing logic in order to prevent data corruption and may occupy a larger area for the same reason. The processor caches may then be faster than the computation logic and may be more costly at NTV. As such, there may be a strong pressure on hardware designers to share the memory across the processor cores, even at the L1 level. As a result, the contention on shared resources is likely to increase at NTV and concurrency throttling may be able to benefit from even more opportunities for energy savings.

Each of the presented parameters of various embodiments of the energy model can benefit EPS and may increase energy efficiency in both NTV and non-NTV architectures. The most significant outcome will certainly come from concurrency throttling. If contention occurs on processor caches for some memory intense workloads e.g., because the processor caches may be shared by two or four cores, concurrency throttling can improve energy efficiency by a factor of two or more.

In various embodiments, an energy model described allows a compiler to choose configuration parameters based on predicted energy savings, so as to achieve EPS. In some embodiments, a compiler can perform fine-grain DVS by exploring all the available frequencies. The power-coherent regions used to delimit sequences or groups of instructions in the program can be executed using a single DVFS setting. The frequencies associated with one or more regions are chosen in various embodiments according to the predicted energy savings and/or consumption associated with executing the region(s). The combination of these improvements can improve the scope of the optimization and its accuracy. Alternatively or in addition, concurrency throttling can save energy. This optimization can exploit the energy model implemented for EPS to determine the concurrency level leading to minimal energy consumption. In various embodiments, it allows a compiler to improve static power consumption whenever possible in addition to or instead of improving dynamic power consumption.

The improvements of EPS, according to various embodiments can lead to an increased energy efficiency. This can improve the overall efficiency of the programs to be run on the PERFECT and other parallel processing architectures. In various embodiments, a compiler can select an efficient hardware configuration at compilation time. EPS according to various embodiments can thus improve the productivity of the application developers by taking care of finding an efficient hardware setup when a new program is compiled. When a program is executed on a standard Linux™ or similar operating system configuration, DVFS may be performed using a runtime deamon, integrated in the operating system. By forcing the hardware configuration from a specific point of programs execution, however, EPS according to different embodiments results in a compile-time predictable, reproducible, and deterministic hardware behavior.

A software controller implementing various techniques described above is included in some embodiments of R-Stream™ and we demonstrated ability of the controller to save energy during our experiments. Concurrency throttling is implemented in some embodiments of R-Stream™ and was shown to save power/energy during our experiments.

As discussed herein, DVFS and concurrency throttling cannot be considered to be a mathematical concept. These optimizations that takes into consideration the properties of a program to be compiled, encapsulated as high-level software parameters described herein and also some parameters of a target computing system, encapsulated as high-level hardware parameters described herein, are also not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in DVFS and/or concurrency throttling, as described herein, are specifically orchestrated. Specifically, various embodiments of the compilation methods and system involve analysis/determination of one or more program characteristics such as the number of computationally intensive operations, the number of memory-access operations, etc. Such embodiments also involve an analysis of a target computation system to be used for execution of the program, such as performance of floating point operations, available resource bandwidth, number of processing units in the target system, power consumed by an operation, etc. Voltage and/or frequency settings, the setting of another power/energy affecting parameter, and/or a suitable concurrency level may be determined using the analyzed parameters. These specific operations make the methods and systems for EPS limited and specialized techniques of improving the power/energy efficiency of a computing system while meeting other performance goals.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A system for optimizing energy consumption of a data processor while executing a program, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
   (a) generate within the program a first power-coherent region;
   (b) compute using an energy model a plurality of estimated energy consumption values for the first power-coherent region, each value corresponding to a respective power setting;
   (c) identify an energy-minimizing power setting corresponding to a minimum of the plurality of the estimated energy consumption values; and
   (d) insert in the first power-coherent region a power setting operation setting at least one parameter of the data processor according to the energy-minimizing power setting, wherein to generate the first power-coherent region, the processing unit is programmed to:
  partition program instructions into a plurality of groups, each group having a specified number of instructions; and
  determine a type of a first group and merging another group into the first group if the type of the first group after the merging would not change and, otherwise designating the other group as a second group.

2. The system of claim 1, wherein the processing unit is programmed to perform operations (a) through (d) via static analysis of the program and without executing any portion of the program.

3. The system of claim 1, wherein at least one of the operations (a) and (b) is based on a polyhedral model of the program.

4. The system of claim 1, wherein the type of the first group comprises one of compute intense and memory intense.

5. The system of claim 1, wherein the processing unit is further programmed to designate a group having a number of instructions at most equal to a specified threshold as a default power-coherent region.

6. The system of claim 1, wherein the energy model comprises at least one of:
  an operating frequency of the data processor, an operating voltage of the data processor, a number of processing units in the data processor, a number of computations in the first power-coherent region, an amount of memory accessed by the first power-coherent region from a first memory level; power consumed by a unit of the data processor during one computation at a specified frequency, power consumed by a unit of the data processor for accessing one byte of data from a specified level of memory at the specified frequency, performance of a unit of the data processor at the specified frequency, and available bandwidth of the data processor at the specified level and using a specified number of processing units.

7. The system of claim 1, wherein to compute an estimated energy consumption value corresponding to a frequency setting, the processing unit is programmed to compute at least one of:
  energy consumed by a plurality of computational operations in the program using: a total number of computational operations in the first power-coherent region and average energy consumed by a single computational operation at the frequency setting; and
  energy consumed by a plurality of memory access operations in the first power-coherent region using: a total number of memory accesses within the first power-coherent region at least one memory level, available memory access bandwidth at the at least one memory level at the frequency setting, average power consumption by a single memory access operation at the frequency setting, and a number of processing units in the data processor.

8. The system of claim 7, wherein the available memory access bandwidth at the at least one memory level at the frequency setting comprises one of:
  a memory access bandwidth computed as function of: (i) a memory access bandwidth required by one processing unit at the at least one memory level at the frequency setting, and (ii) the number of processing units in the data processor; and
  a maximum memory access bandwidth available at the at least one memory level at the frequency setting.

9. The system of claim 7, wherein, the processing unit is further programmed to:
  compute a number of memory accesses required by a data structure within the first power-coherent region;
  compute a stride between consecutive memory accesses by the data structure;
  if the stride does not exceed a bulk-transfer size associated with a first memory level, associate the number of memory accesses required by the data structure with the first memory level; and
  otherwise associate the number of memory accesses required by the data structure with a second memory level.

10. The system of claim 7, wherein the power setting operation setting at least one parameter of the data processor:
  is inserted at a beginning of the first power-coherent region; and
  adjusts at least one of a frequency of the data processor and an operating voltage of the data processor.

11. The system of claim 10, wherein, the processing unit is further programmed to:
  insert at an end of the first power-coherent region another power setting operation that at least one of: (i) adjusts a frequency of the data processor to a default frequency, and (ii) adjusts an operating voltage of the data processor to a default operating voltage.

12. The system of claim 11, wherein, the processing unit is further programmed to:
  identify a second power-coherent region within execution proximity of the first power-coherent region;
  compare: (i) the power setting operation inserted at the beginning in the first power-coherent region, (ii) the power setting operation inserted at the end in the first power-coherent region, and (iii) a power setting operation inserted in the second power-coherent region; and
  based on the comparison, remove at least one of: (i) the power setting operation inserted at the end in the first power-coherent region and (ii) the power setting operation inserted in the second power-coherent region.

13. A system for optimizing energy consumption of a data processor comprising a plurality of $N^T$ processing units, the system comprising:
  a first processor; and
  a first memory in electrical communication with the first processor, the first memory comprising instructions which, when executed by a compilation processing unit comprising at least one of the first processor and a second processor, and in electronic communication with a memory module comprising at least one of the first memory and a second memory, program the compilation processing unit to:
  compute for a particular operation frequency and a particular value of a parameter of a resource, a required single-unit resource capacity for executing a specified program using one unit of the plurality of processing units;
  determine using the single-unit resource capacity, for each value of a number of processing units, denoted N, wherein N ranges from 1 up to $N^T$, a respective resource requirement;
  determine a maximum number of processing units $N_{max}$, such that for a number of processing units greater than erg-mere $N_{max}$ the respective processing capacity would exceed an available resource capacity at the particular operation frequency and the particular value of the resource parameter; and insert into the program a command directing at least one and up to ($N^T - N_{max}$) processing units to enter a sleep mode when a number of processing units operating concurrently exceeds $N_{max}$.

14. The system of claim 13, wherein:
the resource comprises data-processor memory bandwidth; and
the resource parameter comprises a memory level.

15. The system of claim 13, wherein the resource comprises data-processor input-output (I/O) bandwidth.

16. A system for optimizing energy consumption of a data processor comprising a plurality of $N^T$ processing units, the system comprising:
a first processor; and
a first memory in electrical communication with the first processor, the first memory comprising instructions which, when executed by a compilation processing unit comprising at least one of the first processor and a second processor, and in electronic communication with a memory module comprising at least one of the first memory and a second memory, program the compilation processing unit to:
compute for a particular operation frequency and a particular memory level, a required single-unit memory bandwidth for executing a specified program using one unit of the plurality of processing units;
compute using the single-unit memory bandwidth a maximum number of processing units $N_{max}$, such that using more than $N_{max}$, of the plurality of $N^T$ processing units would exceed an available memory bandwidth at the particular operation frequency and the particular memory level;
for each value of a number of processing units N in a range from 1 up to $N_{max}$, estimate using an energy model an energy consumption for executing the specified program using N processing units;
determine an optimized number of processing units $N_{opt}$ for which the estimated energy consumption is minimum; and
insert into the program a command directing at least one processing unit to enter a sleep mode when a number of processing units operating concurrently exceeds the optimized number of processing units $N_{opt}$.

17. The system of claim 16, wherein to compute the required single-unit memory bandwidth, the processing unit is programmed to:
compute a stride distance between two consecutive memory accesses associated with the particular memory level by a selected portion of the specified program; and
compare the stride distance with a size of single access at the particular memory level.

18. The system of claim 16, wherein the energy model comprises:
the number of processing units; and
at least one of: an operating frequency of the data processor, an operating voltage of the data processor, a number of computations in a program, an amount of memory at a specified level accessed by the program; power consumed by a unit of the data processor during one computation at a specified frequency, power consumed by a unit of the data processor for accessing one byte of data from a specified level of memory at the specified frequency, and performance of a unit of the data processor at the specified frequency.

19. The system of claim 16, wherein, the processing unit is further programmed to set a degree of maximum parallelization to the optimized number of processing units $N_{opt}$.

* * * * *